US008226107B2

(12) United States Patent
    Columbia

(10) Patent No.: US 8,226,107 B2
(45) Date of Patent: Jul. 24, 2012

(54) MAXIMUM SECURITY/MAXIMUM VERSATILITY BALL MOUNT ASSEMBLY

(76) Inventor: John R. Columbia, Brownsville, PA (US)

( * ) Notice: Subject to any disclaimer, the term of this patent is extended or adjusted under 35 U.S.C. 154(b) by 164 days.

(21) Appl. No.: 12/025,990

(22) Filed: Feb. 5, 2008

(65) Prior Publication Data

US 2008/0179861 A1    Jul. 31, 2008

Related U.S. Application Data

(63) Continuation-in-part of application No. 11/372,748, filed on Mar. 10, 2006, and a continuation-in-part of application No. 11/732,117, filed on Apr. 2, 2007.

(60) Provisional application No. 60/899,609, filed on Feb. 5, 2007, provisional application No. 60/993,781, filed on Sep. 14, 2007.

(51) Int. Cl.
*B60D 1/06* (2006.01)

(52) U.S. Cl. ......... 280/511; 280/507; 280/504; 280/495

(58) Field of Classification Search .................. 280/507, 280/511, 504, 495
See application file for complete search history.

(56) References Cited

U.S. PATENT DOCUMENTS

| | | |
|---|---|---|
| 2,142,365 A | 1/1939 | McKee |
| 3,181,393 A | 5/1965 | Jandasek |
| 3,655,221 A | 4/1972 | Warner |
| 3,922,006 A | 11/1975 | Borges |
| 3,963,264 A | 6/1976 | Down |
| 4,202,562 A | 5/1980 | Sorenson |
| 4,412,635 A | 11/1983 | Bateman |
| 4,856,686 A | 8/1989 | Workentine |
| 4,938,496 A | 7/1990 | Thomas et al. |
| 5,135,247 A | 8/1992 | Alfaro et al. |
| 5,149,122 A | 9/1992 | Helber |
| 5,397,147 A | 3/1995 | Ducharme et al. |
| 5,465,991 A | 11/1995 | Kass et al. |
| 5,476,279 A | 12/1995 | Klemetsen |

(Continued)

FOREIGN PATENT DOCUMENTS

WO    9714606 A1    4/1997

OTHER PUBLICATIONS http://www.expressdistributing.com/cart/cgi-bin/Html/Products/tow bmnts spcl prod 03.htm, Speciality Ball Mounts; (6 pages); printed Sep. 27, 2004.

*Primary Examiner* — Joanne Silbermann
*Assistant Examiner* — Marlon Arce
(74) *Attorney, Agent, or Firm* — The Webb Law Firm

(57) ABSTRACT

The maximum security/maximum versatility ball mount assembly provides an assembly for securing a ball mount or other accessory shank to a receiver hitch on automotive vehicles, tractors, ATVs, and other vehicles equipped with a receiver-type hitch. As the shank of a hitch accessory or implement is inserted into a receiver, dual retractable hitch pins automatically engage the receiver when the pins align with the two hitch-pin apertures in the receiver tube, thereby securing the ball mount/accessory's shank to the vehicle's receiver. A shank end cap shields the hitch pin assembly's internal components from dirt and/or rust particles, and the end cap also serves as an innovative and useful alignment aid when inserting the shank into a vehicle's receiver.

13 Claims, 32 Drawing Sheets

U.S. PATENT DOCUMENTS

| | | |
|---|---|---|
| 5,562,298 A | 10/1996 | Kass et al. |
| 5,630,606 A | 5/1997 | Ryan |
| 5,649,656 A | 7/1997 | Davy |
| 5,823,560 A | 10/1998 | Van Vleet |
| 5,845,832 A | 12/1998 | Eichmann |
| 5,857,693 A | 1/1999 | Clark, Jr. |
| 5,884,930 A | 3/1999 | Cluth |
| 5,915,714 A | 6/1999 | Bell et al. |
| 5,934,698 A | 8/1999 | Despain |
| 6,089,431 A | 7/2000 | Heyworth |
| 6,125,945 A | 10/2000 | Skaggs et al. |
| 6,126,188 A | 10/2000 | Volodarsky |
| 6,244,483 B1 | 6/2001 | McLemore et al. |
| 6,312,004 B1 * | 11/2001 | Kiss ............................. 280/507 |
| 6,443,345 B1 | 9/2002 | Bloemer et al. |
| 6,502,730 B2 | 1/2003 | Johnson |
| 6,511,088 B2 | 1/2003 | Kahlstorf |
| 6,536,794 B2 * | 3/2003 | Hancock et al. ............. 280/511 |
| 6,595,540 B1 | 7/2003 | MacKarvich |
| 6,709,002 B2 | 3/2004 | Tambornino |
| 6,802,441 B1 | 10/2004 | DuRant et al. |
| 6,802,523 B1 * | 10/2004 | Profitt ......................... 280/507 |
| 6,857,545 B2 | 2/2005 | McLemore et al. |
| 6,866,285 B1 | 3/2005 | Stamp |
| 6,874,804 B2 | 4/2005 | Reese et al. |
| 6,969,085 B2 * | 11/2005 | Causey, Jr. .................... 280/507 |
| 7,052,032 B1 | 5/2006 | Adair |
| 7,258,359 B2 | 8/2007 | Wooten |
| 7,347,441 B2 * | 3/2008 | Rosario ........................ 280/507 |
| 7,431,320 B2 | 10/2008 | Madden, III et al. |
| 7,472,916 B2 * | 1/2009 | Varcoe ............................ 280/19 |
| 2003/0015856 A1 | 1/2003 | Hancock et al. |
| 2003/0205599 A1 | 11/2003 | Brown |
| 2003/0222426 A1 * | 12/2003 | Rosenlund ................. 280/490.1 |
| 2005/0179241 A1 | 8/2005 | McManus |
| 2005/0205630 A1 | 9/2005 | Cooper et al. |
| 2006/0186639 A1 * | 8/2006 | Rosario ........................ 280/507 |
| 2006/0214391 A1 * | 9/2006 | Columbia ................... 280/491.5 |
| 2007/0252360 A1 | 11/2007 | Wooten |
| 2009/0218789 A1 * | 9/2009 | Beck ............................ 280/511 |
| 2009/0302574 A1 | 12/2009 | Columbia |
| 2010/0007116 A1 * | 1/2010 | Columbia ..................... 280/511 |
| 2010/0044999 A1 * | 2/2010 | Columbia ..................... 280/511 |

* cited by examiner

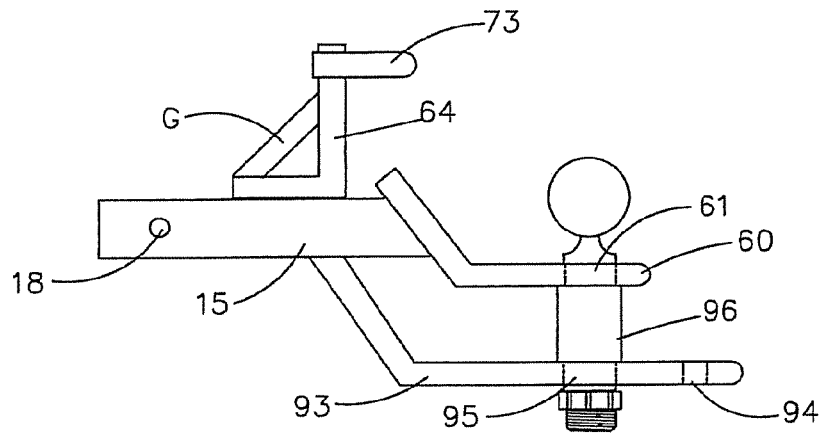
FIG. 8Y1
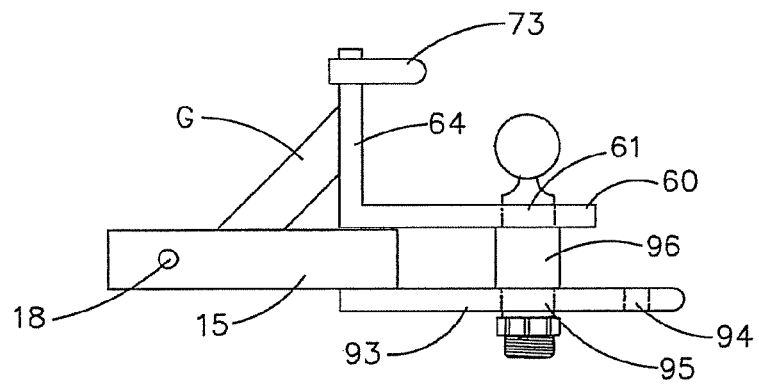
FIG. 8Y2
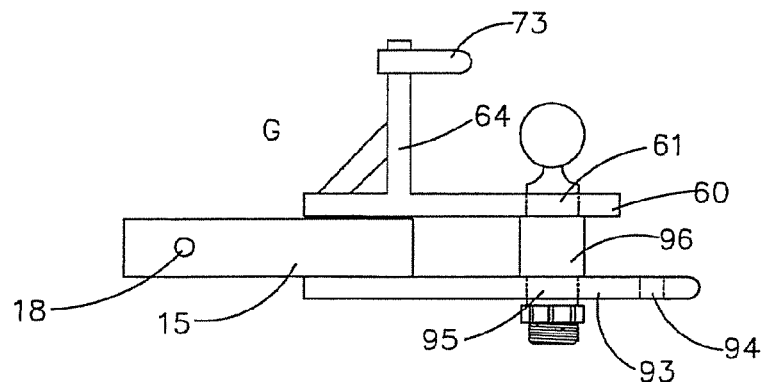
FIG. 8Y3

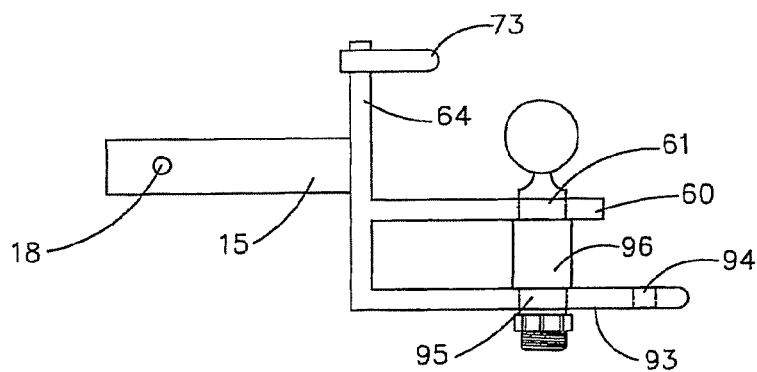
FIG. 8Y4
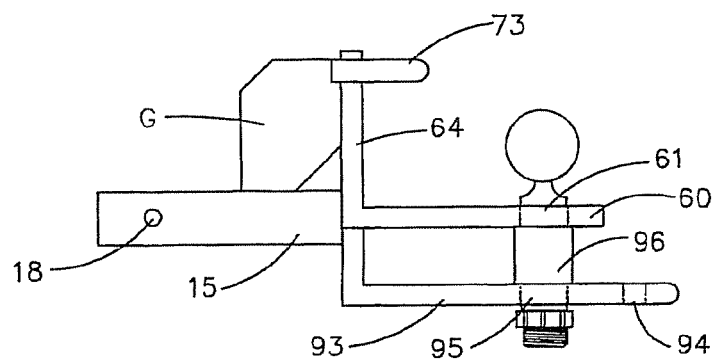
FIG. 8Y5
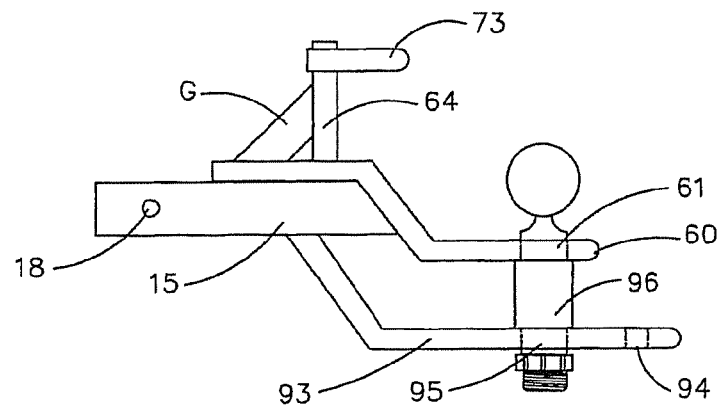
FIG. 8Y6

MAXIMUM SECURITY/MAXIMUM VERSATILITY BALL MOUNT ASSEMBLY

CROSS REFERENCE TO RELATED PATENT APPLICATIONS

This application claims the benefits of U.S. Provisional Application No. 60/899,609, filed on Feb. 5, 2007 and U.S. Provisional Application No. 60/993,781, filed on Sep. 14, 2007, and is a continuation-in-part of U.S. application Ser. No. 11/372,748, filed on Mar. 10, 2006 and U.S. application Ser. No. 11/732,117, filed on Apr. 2, 2007, all of which applications are herein incorporated by reference in their entirety.

BACKGROUND OF THE INVENTION

1. Field of the Invention

The present invention relates generally to trailer hitch accessories, and more particularly, to an improved ball mount assembly that provides a convenient and easy method of engaging and disengaging a ball mount/accessory shank in a trailer hitch receiver tube as well as a method of locking the shank to the receiver. The invention also provides an innovative and highly effective method of attaching additional hitch accessories (such as but not limited to an anti-decoupler safety device) to the ball mount without interfering with the proper towing operation of the hitch ball and trailer socket, resulting in a ball mount assembly with improved safety features.

2. Description of the Related Art

In recent years, the number, variety and type of trailer hitch pins and/or locking pins have increased significantly. However, in most cases, most of the pins are designed to be inserted through the apertures in the receiver which, in the majority of cases, are not conveniently located or easily accessible. In addition, when inserted, the pin generally is located directly above or in front of the receiver's safety chain connection loop/ring mounts and oftentimes components of the protruded hitch pin or locking hitch pin interfere with the proper fastening of safety chains. Without adequate clearance to fasten safety chains to the receiver using properly sized quick links, S-hooks, snap hooks, grab hooks, latch hooks or the like, there may be a tendency to utilize undersized links or hooks to attach the chains causing a potential safety concern. Additionally, based upon the location of the receiver's apertures and owing to the inability to see when the ball mount and receiver apertures are aligned for pinning, people will frequently use a finger to feel when the holes are aligned, oftentimes resulting in pinched fingers. In addition, numerous conventional hitch pin locks currently available in the market utilize rubber o-rings in the locking mechanism. While the o-rings are effective in keeping foreign particles out of the locking mechanism, they often make it more difficult to determine with certainty that the lock is in fact engaged to the hitch pin. Ensuring the lock is engaged to the hitch pin is increasingly more difficult to determine when the receiver apertures are not conveniently located, in darkness, and/or in inclement weather.

While some assemblies have utilized dual retractable pins in lieu of a removable standard hitch pin or locking hitch pin, they generally consist of an integral locking mechanism necessitating a key for operation (for example as in the assembly described in U.S. Pat. No. 7,104,563). In addition to the added expense of a built-in lock assembly, the engagement pins must be in a retracted or engaged position to remove the key (i.e., the ball mount can not be engaged or disengaged from the receiver without the use of a key). With the advent of receiver hitches on numerous off-road vehicles such as ATVs, golf carts, lawn and garden tractors, etc., consumers today want to utilize their hitch equipment interchangeably among vehicles conveniently without the inconvenience and constraints associated with mandatory lock and key operation. A much more practical and desirable assembly is one that permits the engagement pins to be unlocked and disengaged for easy removal without necessitating lock and key operation, but also provide a method for optionally locking the ball mount to the receiver when so desired.

Although the number and variety of hitch-mounted automotive and truck accessories continues to increase, use of the accessories is limited since conventional receiver-type hitches generally consist of only a single receiver tube, and, with the exception of the inventor's Multi-Task Trailer Hitch Assembly disclosed in U.S. Patent Application Publication No. 2006/0214391 A1, conventional ball mounts generally do not accommodate the attachment of additional hitch accessories. Consequently, utilizing an accessory generally precludes the ability to tow since use of an accessory necessitates removing the ball mount to insert a different accessory such as a tow hook, shackle, hitch-step, carry-all, bicycle carrier, etc. Some products have been introduced that attach to a ball mount platform like the hitching-apparatus of U.S. Pat. No. 5,697,630 and the safety hold-down device and hitch guide for trailer decoupling prevention of U.S. Pat. No. 6,969,085 B2. Shortcomings with these products, however, are that they either are secured to the ball mount platform via the trailer ball and cooperating fastener, or do not provide adequate clearance for the universal coupling and unobstructed operation of the various types and styles of trailer tongues on commercial trailers. By securing an accessory to the ball mount via the hitch ball and nut as described in both U.S. Pat. Nos. 5,697,630 and 6,969,085 B2, use of the accessory can apply torque to the accessory's mounting base secured by the hitch ball causing potential ball spin that can loosen the hitch ball.

Thus, a maximum security/maximum versatility ball mount assembly incorporating a self-engaging receiver/hitch pin assembly and accessory support base solving at least some of the aforementioned problems is desirable.

SUMMARY OF THE INVENTION

A self-engaging receiver/hitch pin assembly of the present invention provides an inexpensive, highly-effective and convenient method of securing the shank of a ball mount or other hitch-mounted accessory to a vehicle's receiver hitch. A shank end cap shields the hitch pin assembly's internal components from dirt and/or rust particles, and the end cap also serves as an innovative and useful alignment aid when inserting the shank into a vehicle's receiver. An extended ball mount platform of the present invention also provides an innovative and inexpensive accessory support base for conveniently attaching additional conventional hitch accessories to the ball mount platform in a highly effective manner.

The present invention provides a hitch pin assembly housed within the shank of a ball mount or shank of other hitch mounted accessories. The ball mount, or other accessory shank, is inserted into a vehicle's receiver simply by compressing dual hitch engagement pins and inserting the shank into the vehicle's receiver. As the shank is being further inserted into the receiver, when the dual hitch engagement pins become aligned with the receiver's apertures, the pins automatically become actuated to an extended position and secure the ball mount to the receiver. The ball mount or other accessory is disengaged from the receiver by compressing the dual hitch engagement pins to a retracted position and withdrawing the ball mount from the receiver. When the ball mount or other accessory is hitched to the receiver and the dual hitch engagement pins are in the extended position, the pins can automatically be locked in the extended position, or, in a different embodiment, optionally be locked into the extended position with the use of an inexpensive standard hitch pin simply by inserting a standard hitch pin though a pair of easily accessible apertures strategically and conveniently placed on the ball mount's shank rearward of the vehicle's receiver. Alternatively, as an anti-theft measure, the ball mount or other accessory can be locked to the receiver by using a standard locking hitch pin in lieu of using a standard non-locking hitch pin.

In one embodiment, the self-engaging receiver/hitch pin assembly is mounted in the hollow shank of a ball mount wherein the dual hitch engagement pins are compressed to the retracted position for removing the assembly from the receiver. In another embodiment, the dual hitch engagement pins are automatically locked into place when they are in the extended position, regardless of whether the assembly is locked to the receiver as an anti-theft measure. In another embodiment, by modifying the engagement pin locking method, the assembly is retrofitted into an existing accessory's shank without necessitating the drilling of apertures in the shank being retrofitted. In another embodiment, the self-engaging receiver/hitch pin assembly is mounted in a solid shank. In another embodiment, the pin assembly is mounted on an I-beam type shank. In another embodiment, the self-engaging receiver/hitch pin assembly is mounted in the shank of another hitch mounted accessory such as a tow hook. In other embodiments, the invention includes multiple methods of securing conventional hitch accessories to the ball mount.

One vehicle ball mount assembly of the invention comprises a shank having a top surface with a ball mount platform attached to the shank. An accessory support base extends above the top surface of the shank and the ball mount platform.

Another vehicle ball mount assembly comprises a shank, a ball mount platform attached to the shank, a collar configured to removably engage the shank, a lower ball mount platform connected to the collar and extending below and beyond the ball mount platform, a support sleeve configured to releasably engage the lower ball mount platform, and a tow ball mounted on the ball mount platform and having a shank configured to engage the support sleeve.

A vehicle towing assembly comprises a shank and a tow ring mounted on the shank.

It is an aspect of the invention to provide improved elements and arrangements thereof for the purposes described herein which is inexpensive, dependable, and effective in accomplishing its intended purposes.

These and other aspects of the present invention will become readily apparent upon further review of the following specification and drawings.

BRIEF DESCRIPTION OF THE DRAWINGS

Additional advantages and details of the invention are explained in greater detail below with references to the exemplary embodiments illustrated in the accompanying drawing figures wherein like reference symbols identify like parts throughout.

FIGS. 8Y1 through 8Y6 are side elevation views of alternate designs of the embodiment of FIG. 8S.

Similar reference characters denote corresponding features consistently throughout the attached drawings.

Detailed Description of the Preferred Embodiments

Figure 1:
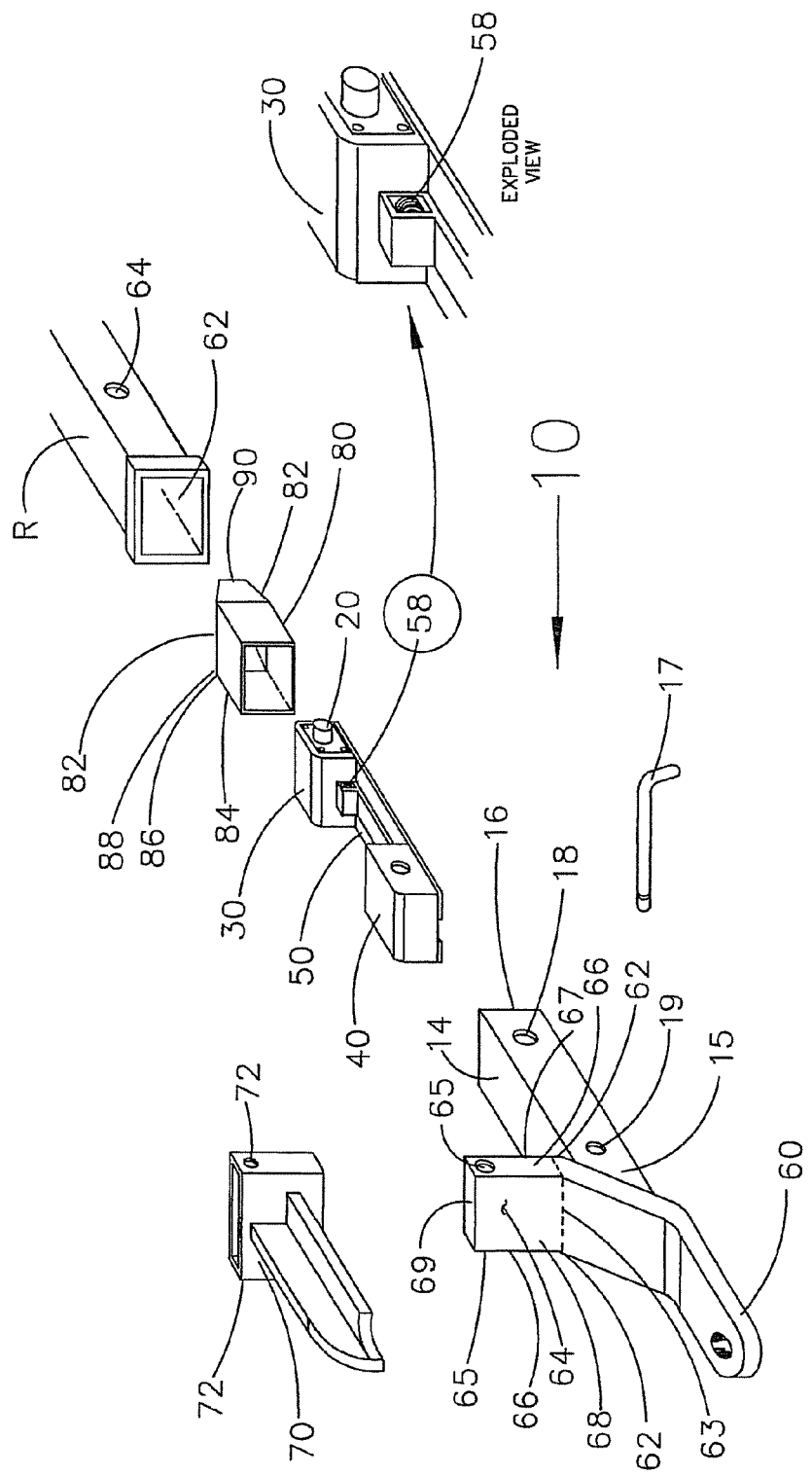
FIG. 1 is an exploded view of a maximum security/maximum versatility ball mount assembly of the present invention.

As used herein, spatial or directional terms, such as "top," "bottom," "left," "right," "over," "under," "front," "rear," and the like, relate to the invention as it is shown in the drawing figures. However, it is to be understood that the invention can assume various alternative orientations, and, accordingly, such terms are not to be considered as limiting. Further, all numbers expressing dimensions, physical characteristics, and so forth, used in the specification, figures, and claims are to be understood as being modified in all instances by the term "about." Accordingly, unless indicated to the contrary, the numerical values set forth in the following specification, figures, and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. The dimensions set forth on the accompanying drawing figures are for one exemplary embodiment of the invention and it is to be understood that the invention is not limited to the specifically disclosed dimensions. All references referred to herein are to be understood as being incorporated by reference in their entirety.

The ball mount and accessory shanks illustrated in the drawings are intended to be illustrative and not exhaustive.

Referring to FIG. 1, there is shown an environmental perspective view of a first embodiment of an inventive maximum security/maximum versatility ball mount assembly referred to by the reference number 10. The assembly 10 performs the function of a standard hitch pin and ball mount that can optionally be locked to a vehicle's receiver R and provides an accessory support base for attaching any additional conventional hitch accessory to the ball mount. The assembly includes a ball mount or accessory shank 15 and one or more, e.g., a pair, of biasing dual hitch engagement pins 20 that are compressed to permit the assembly to easily be inserted and withdrawn from a receiver with minimal effort, while still maintaining a secure connection. The assembly further includes an extended ball mount platform 60 that, in addition to accommodating the hitch ball, serves as an attachment base for securing other conventional-type hitch accessories to the assembly.

The maximum security/maximum versatility ball mount assembly 10 includes a ball mount shank 15 with a hollow housing cavity 16 and two apertures 18 which align with biasing dual hitch engagement pins 20. The ball mount shank also includes one or more, e.g., two, apertures 19 evenly spaced rearward from apertures 18. When the dual hitch engagement pins 20 are in the fully retracted position, they become flush with the outside surface of dual hitch engagement pin subassembly 30 permitting subassembly 50 to be inserted into hollow housing cavity 16. When subassembly 50 is fully inserted into housing cavity 16 of ball mount shank 15, dual hitch engagement pins 20 become actuated to an extended position and secure the subassembly to ball mount shank 15.

Figure 2:
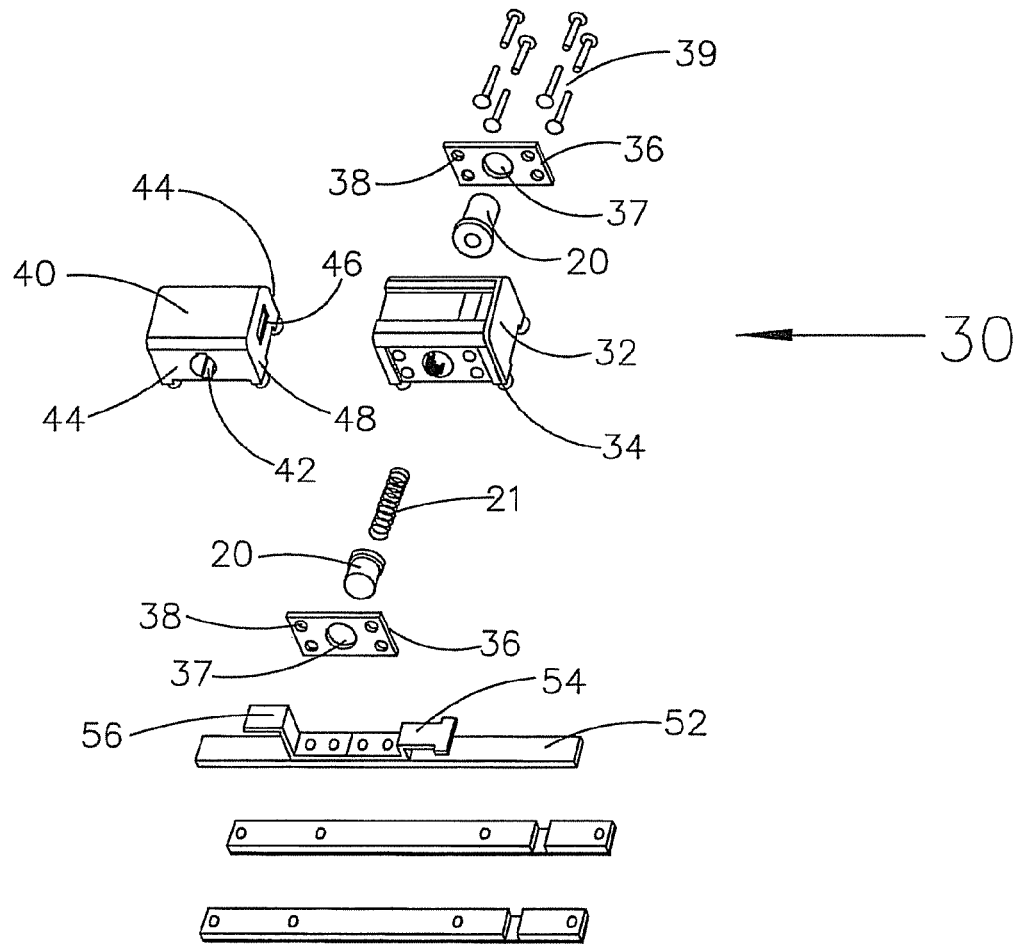
FIG. 2 is an exploded view of the internal components of the maximum security/maximum versatility ball mount assembly of FIG. 1.

The maximum security/maximum versatility ball mount assembly 10 generally includes a ball mount platform 60, ball mount shank 15, and an integral self-engaging receiver/hitch pin subassembly 50 having a dual hitch engagement pin subassembly 30 and standard hitch pin housing 40. The dual hitch engagement pin subassembly 30, shown in FIG. 2, generally includes dual hitch engagement pins 20, a biasing means, such as a spring, 21, and housing 32. Housing 32 as shown includes a main body 34 and dual side plates 36. Dual side plates 36 include apertures 37 through which dual hitch engagement pins 20 extend and apertures 38 through which screws 39 extend to mount dual side plates 36 to housing 32. The biasing means 21 applies force on the dual hitch engagement pins 20 forcing them outward into the engaged position.

Standard hitch pin housing 40 includes throughbore 42 between sides 44 and slot 46 in forward end 48. Slot 46 extends from forward end 48 into throughbore 42. When self-engaging receiver/hitch pin subassembly 50 is inserted into position in hollow housing cavity 16, throughbore 42 in standard hitch pin housing 40 is aligned with apertures 19 in shank 15.

Self-engaging receiver/hitch pin subassembly 50 also contains a hitch engagement pin locking lever 52 for locking engagement pins 20 in the extended position when desirable and/or locking the ball mount to the receiver. Engagement pin locking lever 52 slides forward and rearward between dual hitch engagement pin housing 32 and standard hitch pin housing 40. Locking lever 52 has an engagement pin locking tab 54 and an actuating tab 56. In the forward (locked) position, locking tab 54 extends to a position in between dual hitch engagement pins 20 locking them in the extended position. In the rearward (unlocked) position, locking tab 54 retracts from its position between hitch engagement pins 20, and, through slot 46, actuating tab 56 protrudes slightly into throughbore 42. Locking lever 52 is normally retained in the unlocked position with a biasing means, such as a spring 58 shown in FIG. 1.

Assembled ball mount shank 15 is inserted into receiver R by compressing dual hitch engagement pins 20 until they are flush with the outer surface of ball mount shank 15, then sliding the shank into the receiver R until hitch engagement pins 20 begin to recess into the receiver R. Once a portion of hitch engagement pins 20 are within the receiver R, they will remain in the retracted position. As assembled ball mount shank 15 is being inserted into housing cavity 62 of receiver R, when dual hitch engagement pins 20 become aligned with apertures 64 in the receiver R, they are automatically actuated to an extended position outward through apertures 64 thereby securing the maximum security/maximum versatility ball mount assembly 10 to the receiver R.

Dual engagement hitch pins 20 can be locked in place by inserting a standard hitch pin 17 through apertures 19 on shank 15. When inserting a standard hitch pin 17 through apertures 19, the pin contacts actuating tab 56 on locking lever 52 causing locking lever 52 to move into the forward position extending engagement pin locking tab 54 between dual hitch engagement pins 20 thereby locking hitch engagement pins 20 in the extended position.

The assembly 10 can be locked to the receiver R by inserting a standard locking hitch pin (not shown) through apertures 19 on shank 15 in lieu of using a standard non-locking hitch pin 17.

In the current art, the uppermost surface 62 of an industry standard ball mount platform 60 generally extends a minimal distance above the top side 14 of ball mount shank 15, as represented by dotted line 63 (FIG. 2), providing a surface for welding the upper portion 62 of ball mount platform 60 to topside 14 of ball mount shank 15. The assembly 10 of the present invention embodies inventive ball mount platform 60 featuring an extended vertical platform section 64.

Figure 1A:
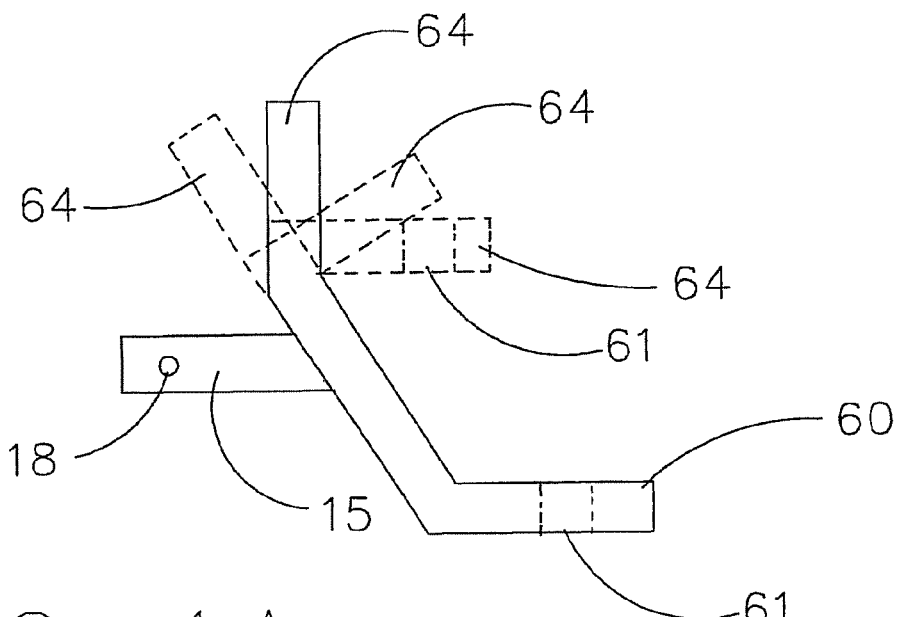
FIG. 1A is a side elevation view of the maximum security/maximum versatility ball mount assembly of FIG. 1.
Figure 1B:
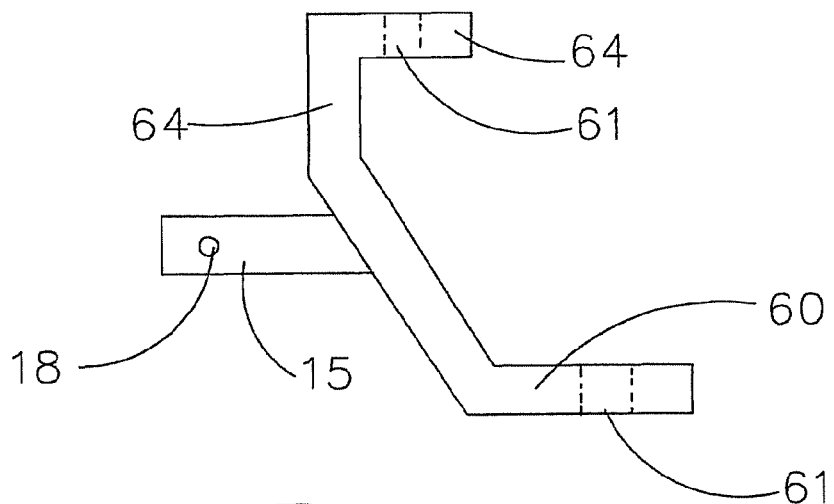
FIG. 1B is a side elevation view of the maximum security/maximum versatility ball mount assembly of FIG. 1 with the accessory support base shown in an alternate position.

Extended vertical platform section 64 (herein after referred to as accessory support base 64) of ball mount platform 60 serves as a support base for attaching any conventional hitch accessory to the assembly 10. As shown in FIG. 1, accessory support base 64 serves as a support base for engaging accessory attachment base 70. As shown, accessory support base 64 contains thoughbore 65 extending between accessory support base sides 66 that align with throughbores 72 on accessory attachment base 70 when accessory attachment base 70 is engaged to, and seated on, accessory support base 64. A standard-type pin or locking-type pin (not shown) is inserted through apertures 72 on accessory attachment base 70 and 65 on accessory support base 64 of ball mount platform 60 to secure hitch accessory to the Assembly 10. Accessory support base 64 is shown in a vertical position (perpendicular to portion of ball mount platform that houses hitch ball) but can be in an acute, obtuse or horizontal position as shown in FIG. 1A or combination of positions (such as vertical and horizontal) as shown in FIG. 1B. FIG. 1B shows a first leg (vertical) and a second leg (horizontal) at an angle from each other. As shown in FIGS. 1A and 1B, accessory support base 64 may contain vertical throughbore 61 for facilitating the attachment of a tow ball. Throughbore 61 may also be useful for attaching a shackle or other accessory to accessory support base 64. Throughbore 61 may also be used for pinning an accessory attachment base 70 to accessory support base 64. Additionally, although accessory support base 64 is shown as square in configuration, accessory support base 64 can be of numerous configurations, such as rectangular, triangular, etc., without departing from the scope of this invention. In addition, although shown with circular-shaped throughbore 65 in accessory support base 64, as can be appreciated by one skilled in the art, accessory support base 64 can be of numerous configurations to secure accessory attachment base 70 to accessory support base 64. For example, accessory support base 64 may have one or more bores or throughbores on its sides 66, forward face 67, rearward face 68 and/or top 69. Bores may, or may not, contain an internal thread convolution. Bores may be circular or noncircular in shape, and in a conforming configurations with bores 72 on accessory attachment base 70, may be in the form of other shapes such as, but not limited to, D shaped, star shaped, square shaped, rectangular shaped, triangular shaped, pentagon shaped, hexagon shaped, octagon shaped, etc. Additionally, as will also be appreciated by one skilled in the art, accessory support base 64 may alternatively have one or more protrusions such as bolts, pins, rods, shanks, etc. on its sides 66, forward face 67, rearward face 68 and/or top 69. In addition to securing accessory attachment base 70 to accessory support base 64, protrusions may be useful for serving as an attachment point for accessories, such as an anti-decoupler device, that may pivot on the protrusion to and from an engaged and disengaged position. Bores, throughbores and protrusions described in this paragraph may not only be applied to the surfaces of accessory support base 64, but also may be applied to surfaces on the industry standard ball mount as well.

In conjunction with inventive assembly 10, the following list (intended to be illustrative and not exhaustive) of conventional hitch accessories can be attached to the accessory system: hitch coupling alignment devices, anti-decoupler devices, accessory receiver tube(s), brake lights, taillights, indicia plates, bumper sticker holders, hitch plugs, license plate frames or holders, additional ball mounts, receiver extension/adapter/reducer, tow ring, shackle, tow hook, bicycle carrier, ski rack, canoe rack, ladder rack, luggage rack, truck extension, spare tire carrier, gas can carrier, steps, carry all, ATV carrier, grill carrier, cargo basket, ATV tie-down system, motorcycle carrier, wheel chair carrier, pet carrier, pet step, light bar, winch mount, generator stand, tree stand holder, bow holder, gun rack, fishing rod carrier, ice auger carrier, bucket carrier, crate carrier, tool carrier, tool box, cargo box, work bench, chain saw carrier, extension cord reel, garden hose reel, and seed and salt spreader, and numerous other accessories.

Figure 4:
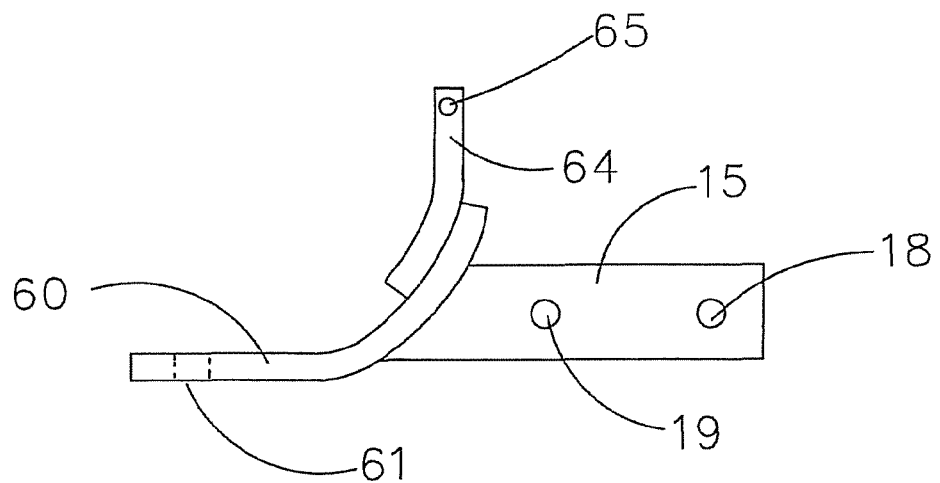
FIG. 4 is a side elevation view of another embodiment of FIG. 1 with an alternative accessory support base.
Figure 5:
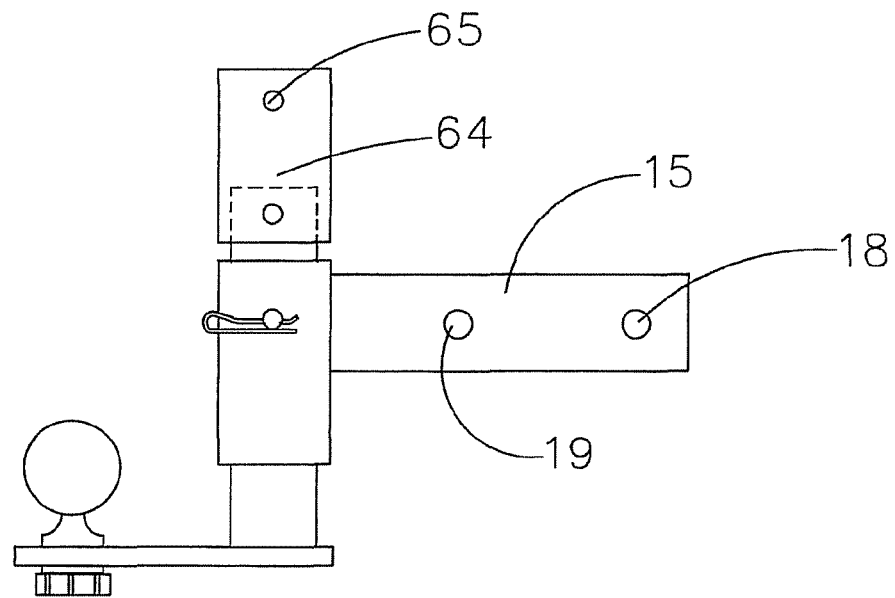
FIG. 5 is a side elevation view of yet another embodiment of FIG. 1 with the accessory support base mounted on the shank of an adjustable height ball mount.
Figure 6:
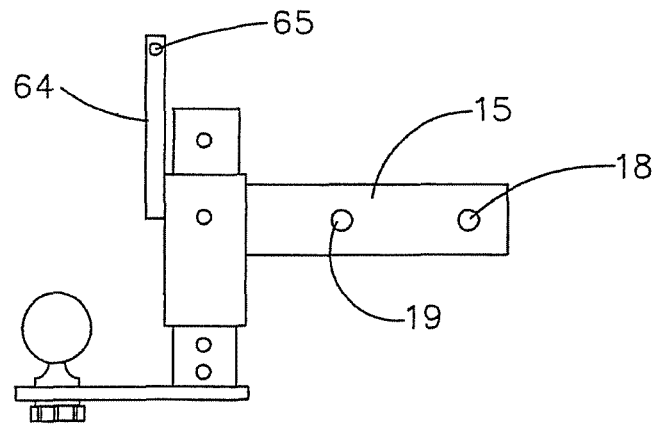
FIG. 6 is a side elevation view of another embodiment of FIG. 1 with the accessory support base mounted on the sleeve of an adjustable height ball mount.
Figure 7:
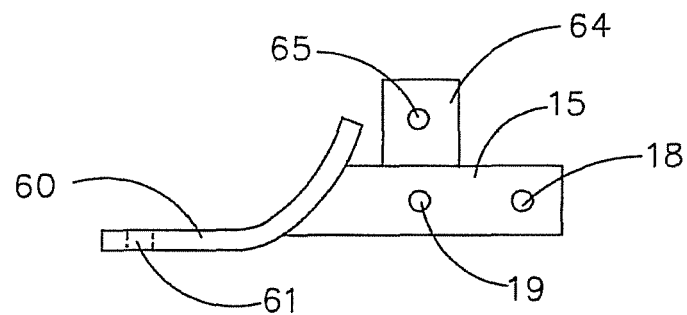
FIG. 7 is a side elevation view of another embodiment of FIG. 1 with the accessory support base mounted on the shank of a ball mount.
Figure 7A:
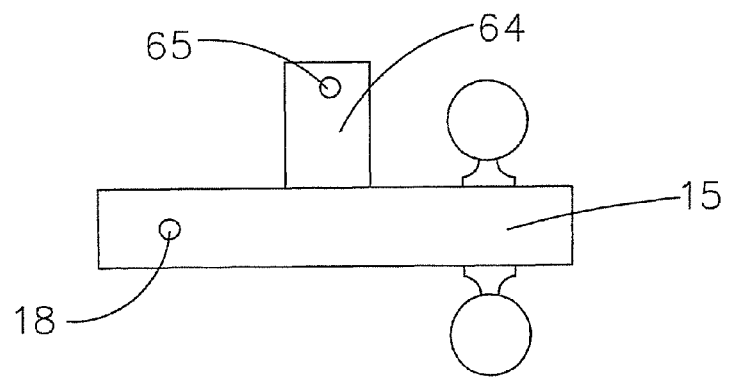
FIG. 7A is a side elevation view of another embodiment of FIG. 1 with the accessory support base mounted on the shank of a ball mount without a ball mount platform.

In lieu of ball mount platform being forged as one piece including accessory support base 64, in another embodiment, as shown in FIG. 4, accessory support base 64 may be a separate piece bolted or welded to an industry standard ball mount platform. In another embodiment, accessory support base 64 may be bolted, welded or pinned to the shank, sleeve or head of a weight distribution hitch or to the shank or sleeve of an adjustable height ball mount as shown in FIGS. 5 and 6, respectively. In another embodiment, as shown in FIG. 7, accessory support base 64 may be welded to the top of an exposed shank of a conventional ball mount between the ball mount platform and the hitch receiver when the ball mount shank is engaged by the hitch receiver of a vehicle. Alternatively, accessory support base 64 may be welded to the top-side, bottom side and/or sides of an exposed shank of any ball mount shank or other hitch-mounted accessory shank, and not limited to ball mount shanks including a platform such as a double-ball mount without a platform as shown in FIGS. 7A and 8A. This exposed shank is common in the design of many commercial hitch systems. In lieu of accessory support base 64 being welded directly to the top side of an exposed shank of a conventional ball mount between the ball mount platform and the hitch receiver, accessory support base 64 may, as shown in FIG. 8, alternatively be welded to a tube 64T that serves as a collar or sleeve that fits over the exposed ball mount shank.

Figure 8:
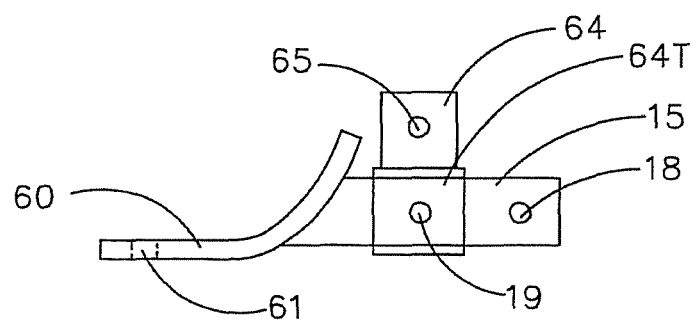
FIG. 8 is a side elevation view of another embodiment of FIG. 1 with the accessory support base mounted on a sleeve that fits over the shank of a ball mount.
Figure 8A:
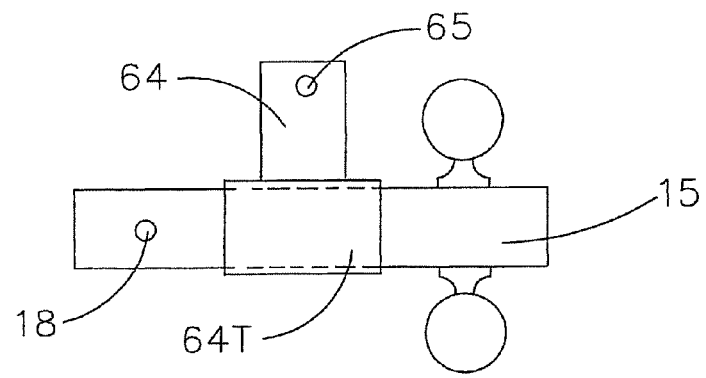
FIG. 8A is a side elevation view of another embodiment of FIG. 1 with the accessory support base mounted on a sleeve that fits over the shank of a ball mount without a ball mount platform.
Figure 7B:
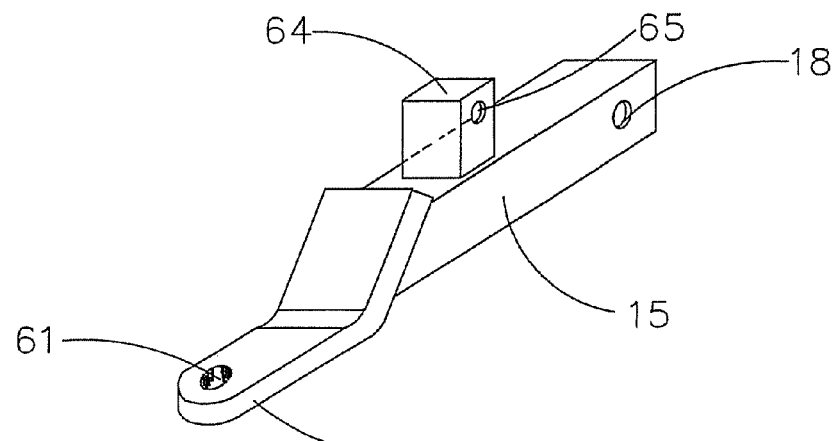
FIG. 7B is a side rear perspective view of another embodiment of FIG. 1 with the accessory support base shown as square tubing mounted on the shank of a ball mount.
Figure 8B:
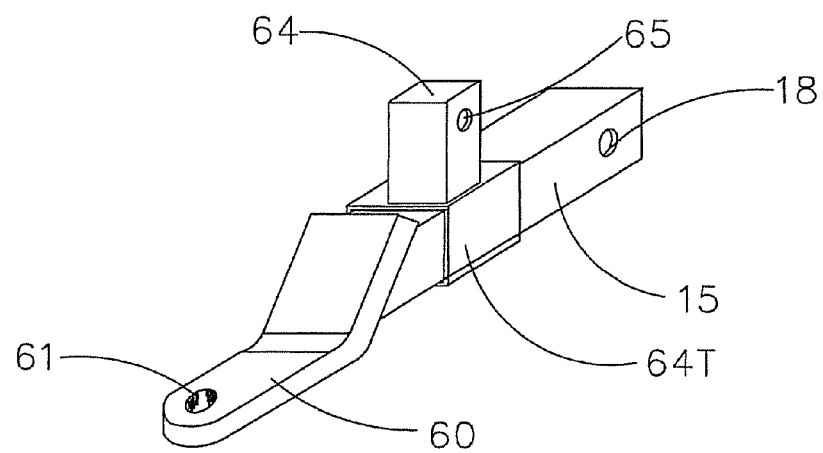
FIG. 8B is a side rear perspective view of another embodiment of FIG. 1 with the accessory support base shown as square tubing mounted on a sleeve that fits over the shank of a ball mount.

Accessory support base 64 need not be a continuation of the same steel bar comprising ball mount platform 60 as shown in FIGS. 7 and 8, but may be configured from various shaped and size materials. For example, FIGS. 7B and 8B show accessory support base 64 consisting of square tubing with apertures 65, although round or other shaped tubing could be employed as well.

Figure 7C:
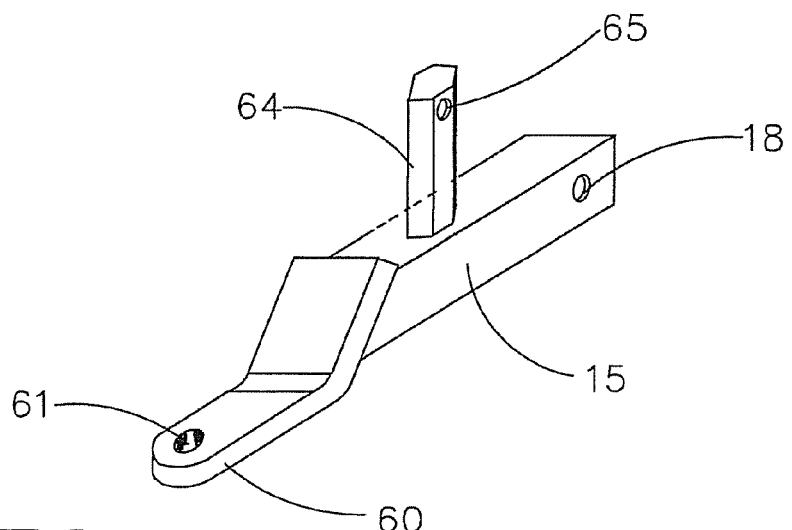
FIG. 7C is a side rear perspective view of another embodiment of FIG. 1 with the accessory support base shown as a hexagon mounted on the shank of a ball mount.
Figure 8C:
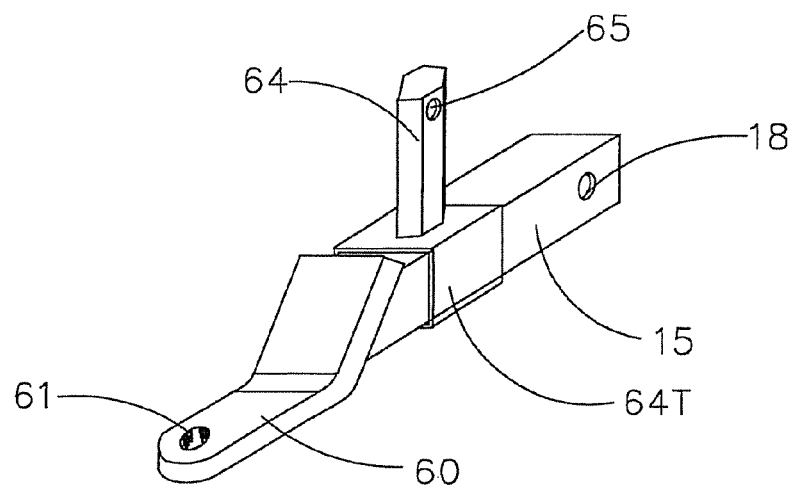
FIG. 8C is a side rear perspective view of another embodiment of FIG. 1 with the accessory support base shown as a hexagon mounted on a sleeve that fits over the shank of a ball mount.

FIGS. 7C and 8C show accessory support base 64 being comprised of a hexagon-shaped shank with apertures 65, although round and other shaped shanks could be employed as well.

Figure 7D:
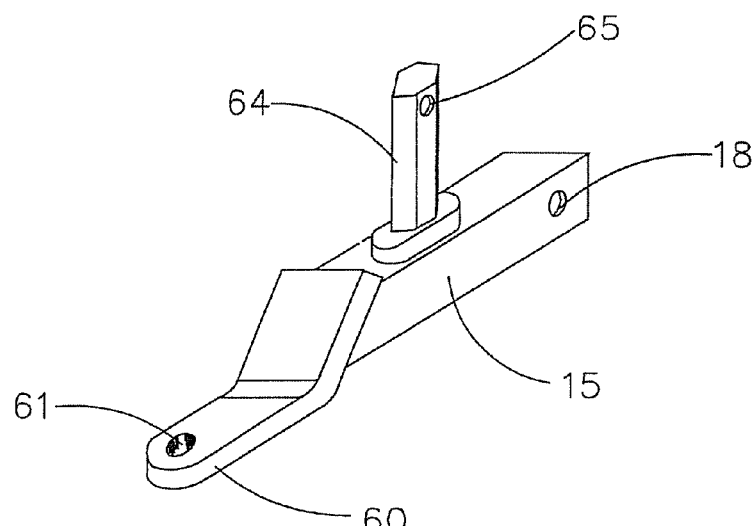
FIG. 7D is a side rear perspective view of another embodiment of FIG. 1 with the accessory support base shown as a hexagon including a flange that is mounted on the shank of a ball mount.
Figure 8D:
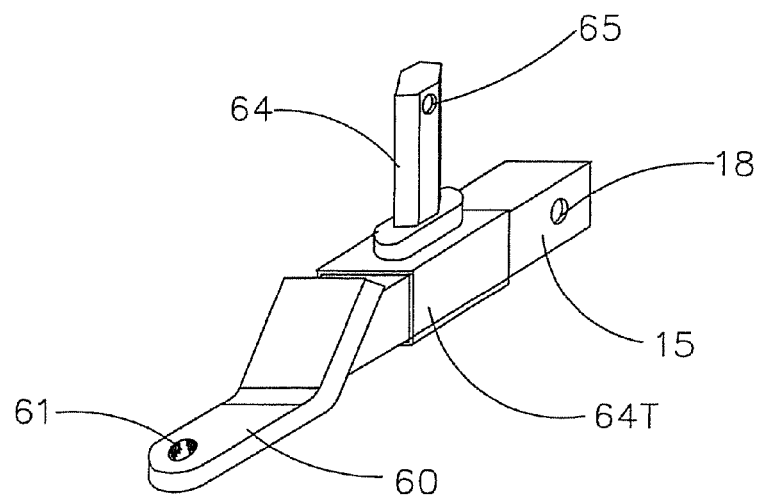
FIG. 8D is a side rear perspective view of another embodiment of FIG. 1 with the accessory support base shown as a hexagon including a flange that is mounted on a sleeve that fits over the shank of a ball mount.

FIGS. 7D and 8D show accessory support base being comprised of a hexagon-shaped shank on a mounting flange base with apertures 65. This embodiment may utilize the upper portion (flange and post) of any interchangeable hitch ball assembly to function as accessory support base 64. Accessory support base 64 of the embodiments of FIGS. 7B, 8B, 7C, 8C, 7D and 8D may be solid or hollow and consist of an internal and/or external thread convolution.

Figure 8E:
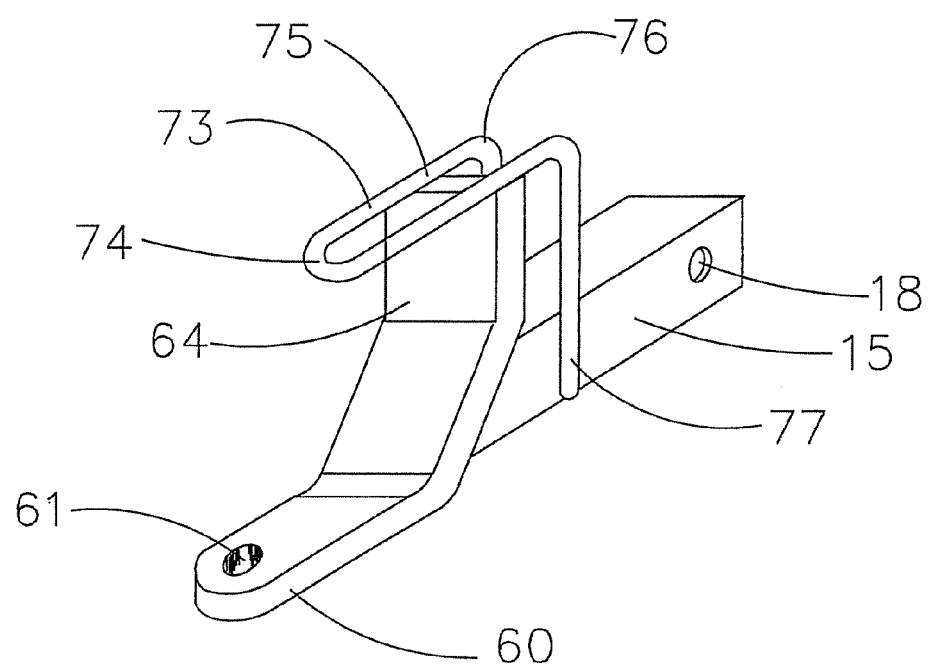
FIG. 8E is a side rear perspective view of another embodiment of FIG. 1 with the accessory support base shown as a support member for bracing and/or supporting additional ball mount structure.

Additionally, as shown in FIG. 8E, accessory support base 64 may also be useful and serve as a support member for bracing and/or supporting structure anchored from another location on ball mount assembly 10. In this embodiment, accessory support base 64 functions as a brace to support tow ring 73. Tow ring 73 has a round rear-section 74, mid-section 75, forward-section 76 and attachment legs 77. Attachment legs 77 are attached to the sides of shank 15, and accessory support base 64 serves as a brace to support tow ring 73 at its mid-section 75 when accessory support base 64 is attached to tow ring 73 such as by welding.

Figure 8F:
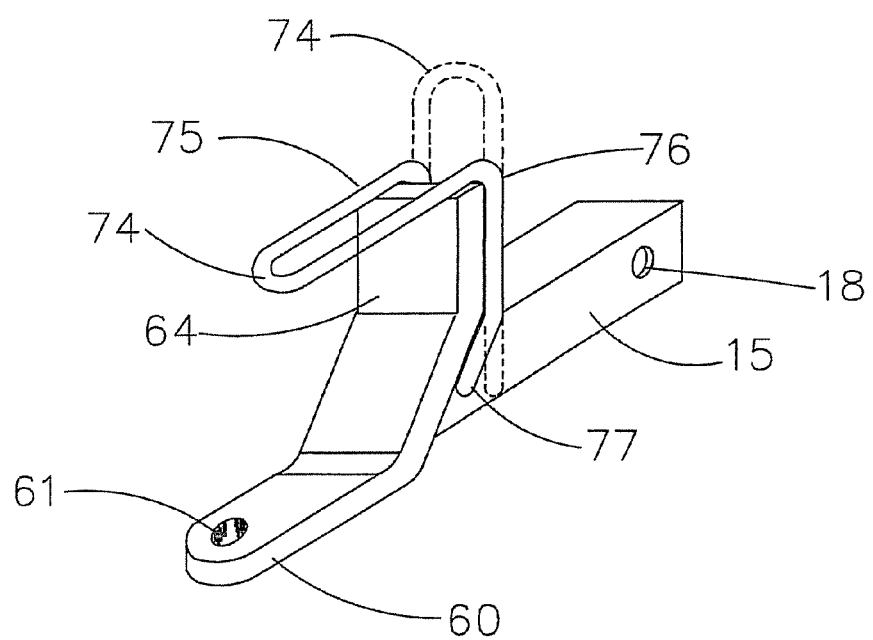
FIG. 8F is a side rear perspective view of another embodiment of FIG. 1 with accessory support base shown as a support member for bracing and/or supporting additional ball mount structure attached to the ball mount in an alternate position.

Additionally, as shown in FIG. 8F, in addition to attachment legs 77 being welded to shank 15, attachment legs 77 of tow ring 73 may abut and also be attached, such as by welding, to forward face 67 and/or sides 66 of accessory support base 64. In this embodiment, rounded section 74 of tow ring 73 need not necessarily extend rearward and perpendicular to attachment legs 77, but may extend upward from attachment legs 77 as represented by the dotted line.

Figure 8G:
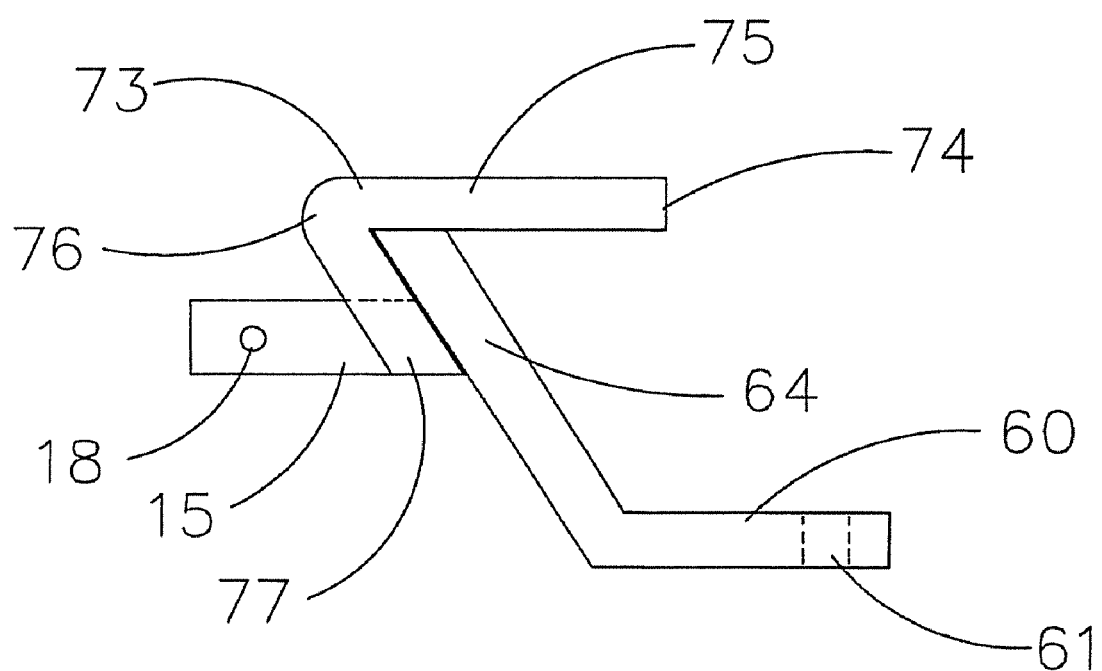
FIG. 8G is a side elevation view of another embodiment of FIG. 1 with a modified accessory support base shown as a support member for bracing and/or supporting additional ball mount structure.

As shown in FIG. 8G, accessory support base 64 need not extend vertically beyond the distance of a conventional ball mount platform to support mid-section 75 or forward section 76 of tow ring 73. This embodiment is particularly useful on ball mounts with an increased drop.

Figure 8H:
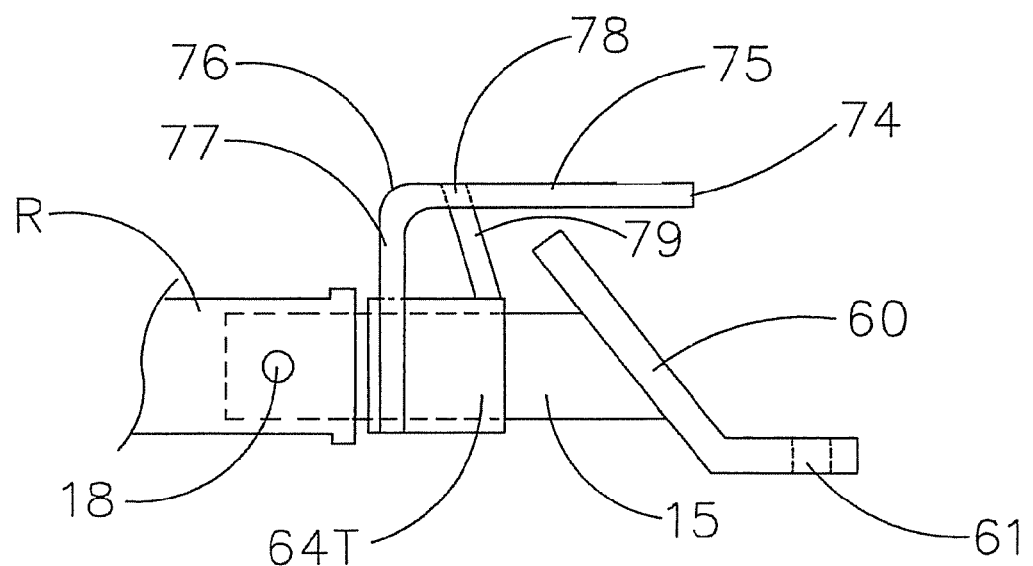
FIG. 8H is a side elevation view of another embodiment of FIG. 1 with a modified tow ring for retrofitting an existing ball mount.

Referring to FIG. 8H, there is shown an alternate tow ring embodiment of the assembly 10 useful for retrofitting a tow ring to existing ball mounts. In this embodiment, in lieu of tow ring 73 attachment legs 77 being attached to shank 15 and/or accessory support base 64, attachment legs 77 are attached to collar 64T configured to engage a ball mount shank 15 or other accessory shank and maintained in position on shank 15 between ball mount platform 60 and receiver R when ball mount shank 15 is coupled to receiver R. In this embodiment, in lieu of accessory support base 64, tow ring mid-section 75 may be supported with the use of tow ring cross-member 78 and support post 79. Cross member 78 extends between tow ring sides at mid-section 75 and support post 79 positioned between cross-member 78 and collar 64T.

In another embodiment, in lieu of accessory support base 64 being configured like a shank that engages within accessory attachment base 70 that is configured like a receiver, the configurations may be reversed with accessory support base 64 being configured like a receiver to receive and house accessory attachment base 70 that is configured like a shank and inserted into accessory support base 64. Additionally, although accessory support base 64 and accessory attachment base 70 are shown as rectangular in shape, they may be shaped in other configurations such as round, square, oval, triangular, etc.

In another embodiment, in lieu of accessories being removably attached to accessory support base 64, any accessory may be permanently affixed to accessory support base 64 as by welding and become a permanent feature of the assembly 10. In this embodiment, when any accessory is permanently affixed to accessory support base 64, as by welding, and becomes a permanent feature of ball mount assembly 10, attachment base 70 may be eliminated from the accessory, and the accessory directly welded to accessory support base 64.

Figure 8I:
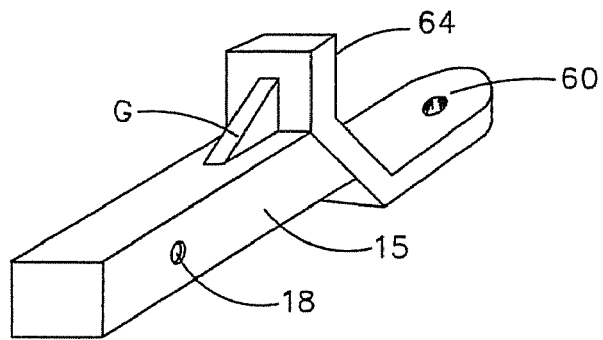
FIG. 8I is a forward side perspective view of the embodiment of FIG. 1.

Referring to FIG. 8I, there is shown a forward side perspective view of the assembly 10. Gussets and other reinforcement elements may be added as desired to any of the embodiments of this invention. FIG. 8I, as well as several other Figs., shows gussets G for illustrative purposes. As can be appreciated by this illustration, accessory support base 64, in and of itself, is useful for, and functions as, a body guard or bumper guard, protecting the tow vehicle from unintended coupler impact when backing up to couple a trailer.

Figure 8J:
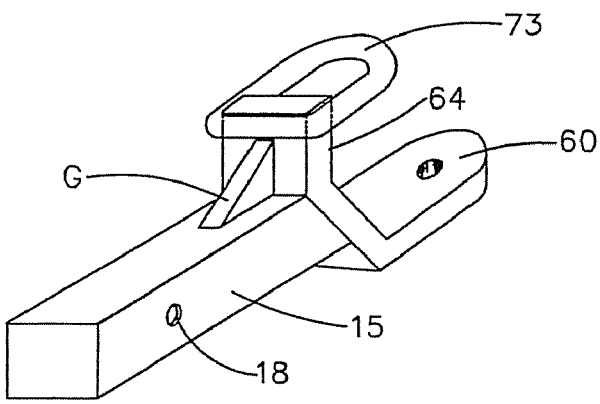
FIG. 8J is a forward side perspective view of an alternate embodiment of FIG. 8E.
Figure 8K:
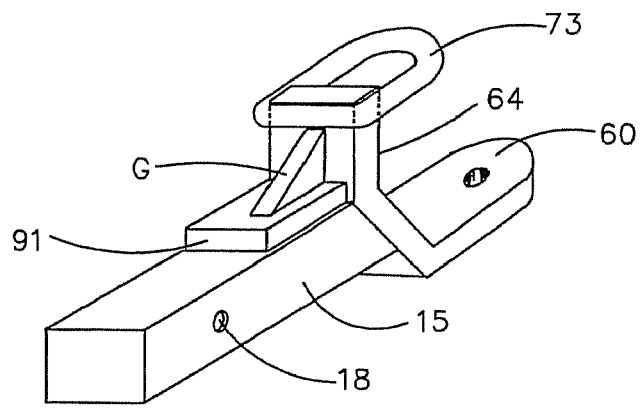
FIG. 8K is a forward side perspective view of the embodiment of FIG. 8J with an additional support member.

As previously stated, in lieu of accessories being removably attached to accessory support base 64, any accessory may be permanently affixed to accessory support base 64. FIG. 8J shows, as an illustrative example and not as a limiting embodiment, tow ring 73 permanently attached as by welding to accessory support base 64. If desirable, as shown in FIG. 8K, additional support bar 91 may be mounted on topside of shank 15 forward of accessory support base 64.

Figure 8L:
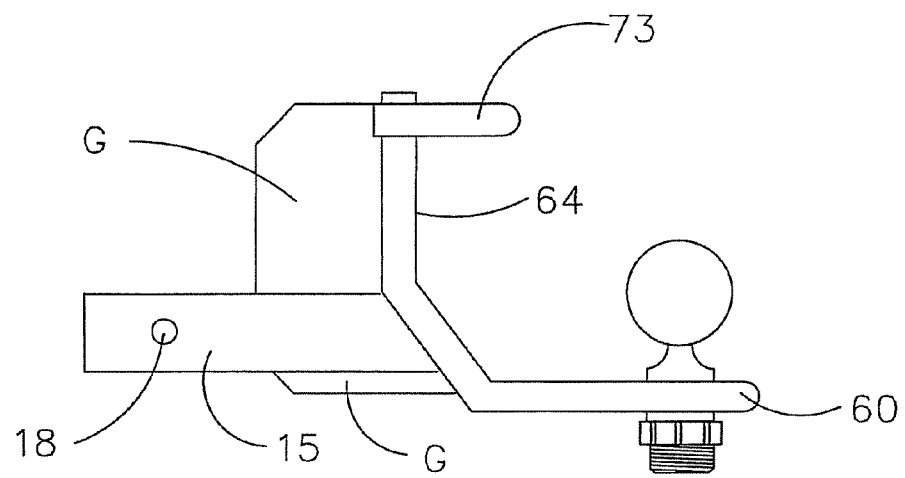
FIG. 8L is a side elevation view of the embodiment of FIG. 8J.

As shown in FIG. 8L, gussets may be added as desirable to either the top side and/or bottom side of shank 15 and abut ball mount platform 60 and/or accessory support base 64.

Figure 8M:
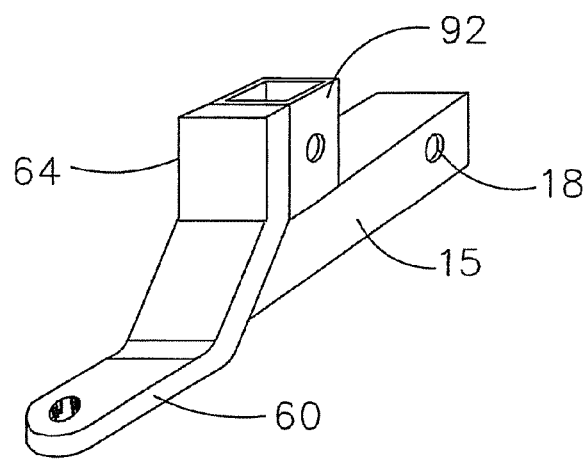
FIG. 8M is a side rear perspective view of an alternate embodiment of FIG. 1 wherein the ball mount's accessory support base member functions as a gusset in supporting an accessory receiver tube.

As shown in FIG. 8M, accessory support base 64 may itself be used as a gusset to support additional structure such as receiver tube 92 as shown.

Figure 8N:
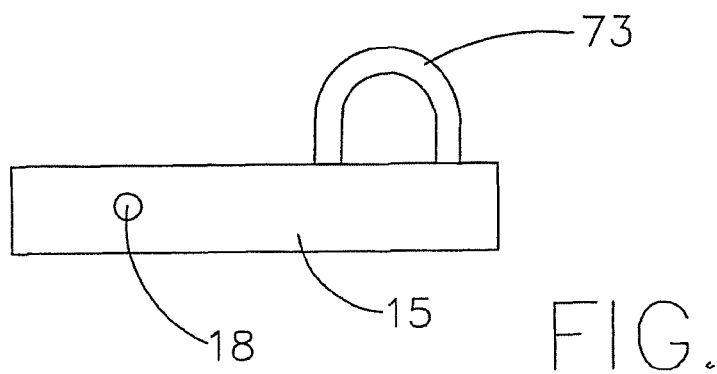
FIG. 8N is a side elevation view of an alternate embodiment of FIGS. 8J, 8K and 8L.
Figure 8O:
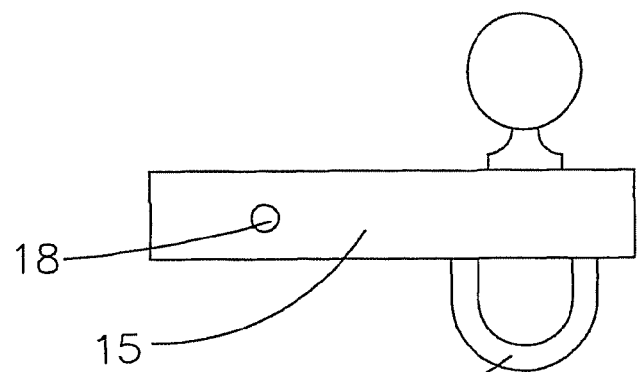
FIG. 8O is a side elevation view of another illustration of the embodiment of FIG. 8N.
Figure 8P:
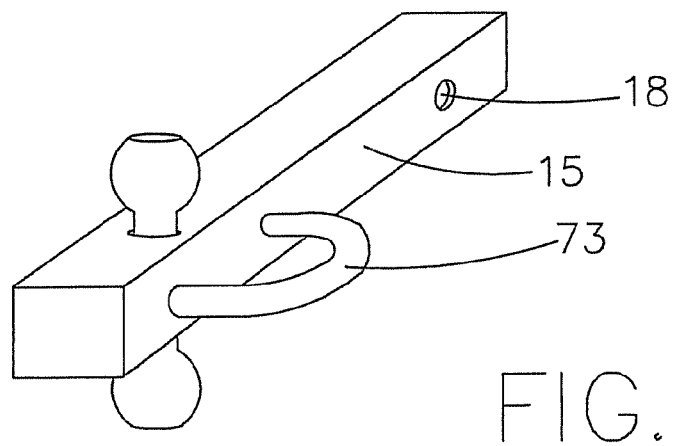
FIGS. 8P and 8Q are side rear perspective views of additional illustrations of the embodiment of FIG. 8N.
Figure 8Q:
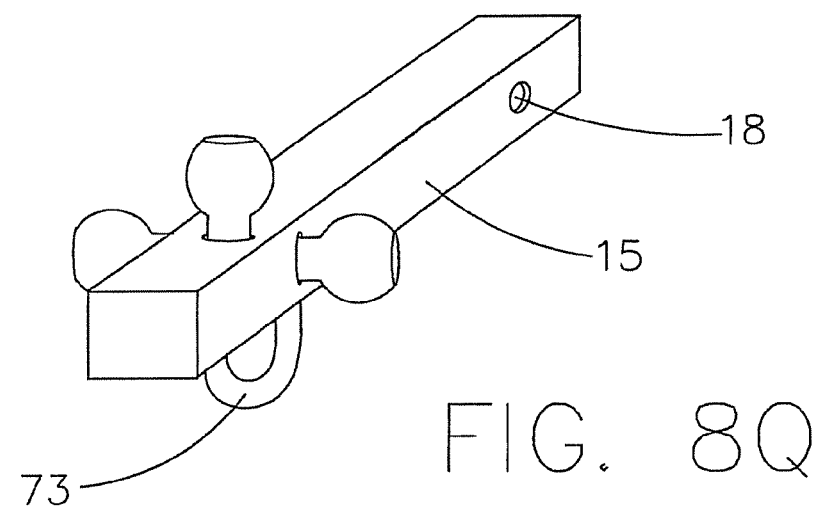

Referring to FIG. 8N, in lieu of mounting tow ring 73 on accessory support base 64, in this embodiment, tow ring 73 may be mounted parallel with shank 15 to any hitch accessory shank. As illustrative examples, and not as limited embodiments, FIGS. 8O, 8P and 8Q show tow ring 73 mounted on a single ball, double ball and triple ball, ball mounts. Tow ring 73 is not limited to being rounded and unshaped as shown, but may be of any shape or configuration resulting in a closed loop to which chains, tow hooks and the like can be fastened.

Figure 8R:
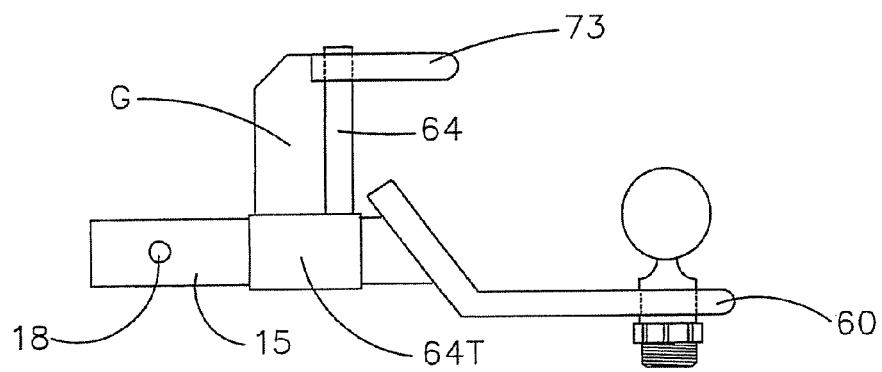
FIG. 8R is a side elevation view of another embodiment of FIG. 1.

Referring to FIG. 8R, there is shown a side elevation view of an alternate embodiment of FIG. 1. In this embodiment, in lieu of accessory support base 64 being a vertical extension of ball mount platform 60, accessory support base 64 is mounted on tube 64T that serves as a collar or sleeve that slides on ball mount shank 15. Although FIG. 8R shows tow ring 73 attached to accessory support base 64, any accessory such as a tow hook, shackle mount, receiver tube, etc. may be substituted in lieu thereof.

Figure 3:
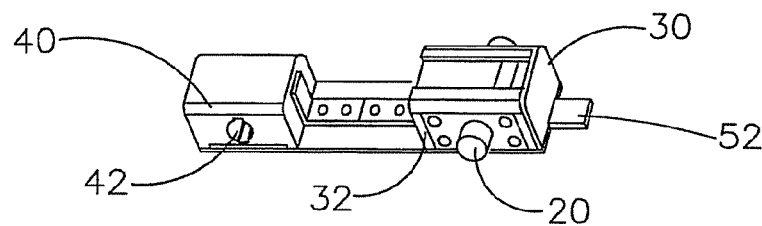
FIG. 3 is a perspective view of the internal components of FIG. 2.
Figure 8S:
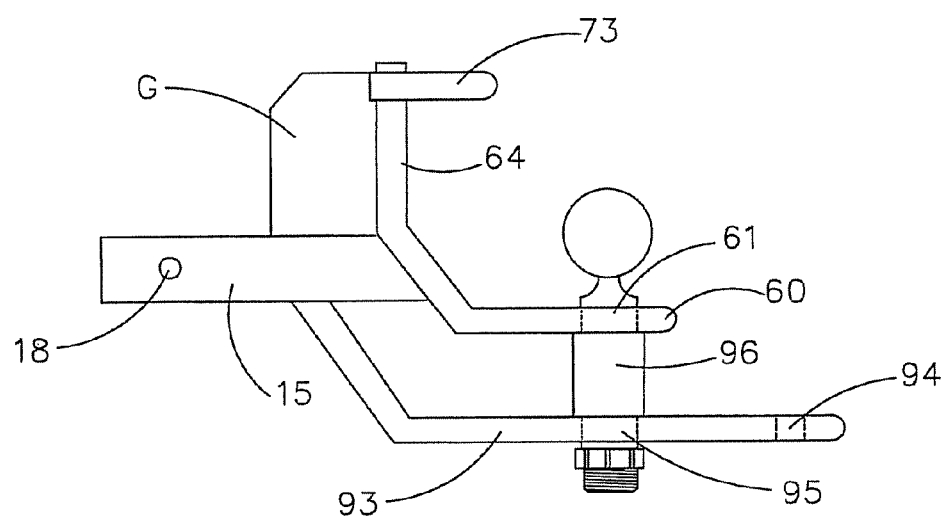
FIG. 8S is a side elevation view of yet another embodiment of FIG. 1.

Referring to FIG. 8S, there is shown a side elevation view of another embodiment of FIG. 1. This embodiment incorporates embodiments of U.S. application Ser. No. 11/372,748, (herein incorporated by reference) filed on Mar. 10, 2006, into this application; specifically, ball mount platform extension tab 6 of FIGS. 2A and 3A, tongue-type hitch 120 of FIGS. 2B, 3B and 8, and/or lower flange 2 of FIGS. 3C, 11 and 12, as well as steel spacer 21 of FIGS. 3C, 11 and 12. In this embodiment, lower ball mount attachment platform 93 is attached to underside of ball mount shank 15 forward of ball mount platform 60. Steel spacer 96 is placed between ball mount platform 60 and lower ball mount attachment platform 93 aligned between throughbores 61 in ball mount platform 60 and 95 in lower ball mount attachment platform 93. Steel spacer 96 may be held in position on the assembly by tow ball shank when tow ball is installed and secured with cooperating fastener. Alternatively, steel spacer 96 may be positioned between ball mount platform 60 and lower ball mount attachment platform 93 in alignment with throughbores 61 and 95 and permanently mounted in position to the assembly as by welding. Lower ball mount attachment platform 93 extends rearward of upper ball mount platform 60 and contains throughbore 94 in lower ball mount attachment platform 93 making it useful for coupling products configured with a bifurcated trailer tongue to the assembly with a clevis pin and other uses. The attachment of lower ball mount attachment platform 93 to the underneath side of shank 15 is not restricted to the location on shank 15 as shown, but may be attached to the underside of shank 15 at any desired location including the most rearward position abutting ball mount platform 60. At its attachment surface, lower ball mount attachment platform 93 may even be welded to ball mount platform 60 in lieu of being attached to shank 15 and/or be welded to ball mount platform 60 in addition to being welded to shank 15.

Figure 8T:
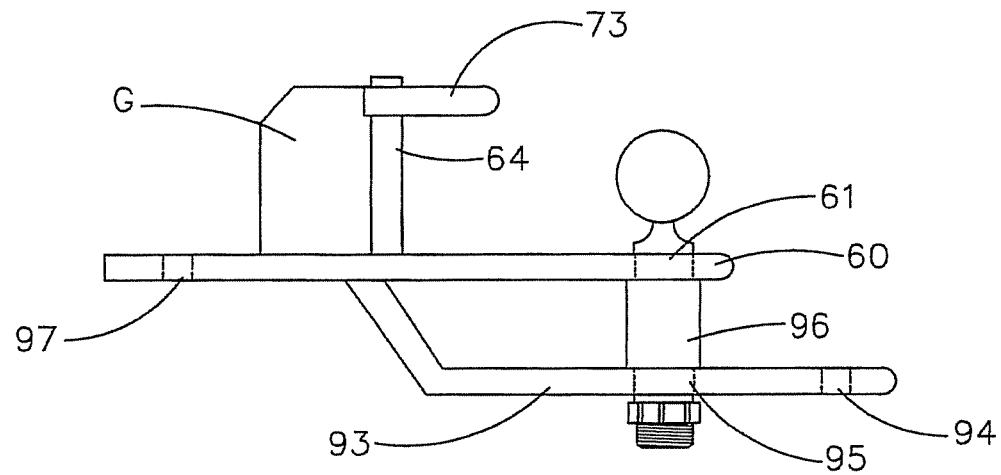
FIG. 8T is a side elevation view of still yet another embodiment of FIG. 1.

Referring to FIG. 8T, there is shown a side elevation view of an embodiment similar to that of FIG. 8S, but, in lieu of comprising ball mount shank 15 for attaching the assembly to a tow vehicle's receiver, ball mount platform 60 is attached or bolted to a tow vehicle not equipped with a receiver hitch via throughbore 97 in ball mount platform 60.

Figure 8U:
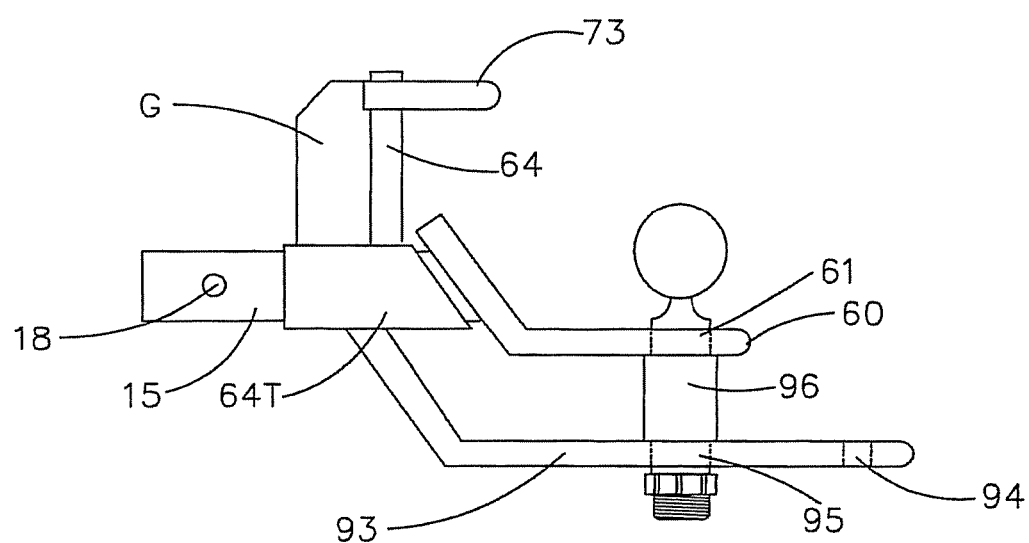
FIG. 8U is a side elevation view of an alternate embodiment of FIG. 8S.

Referring to FIG. 8U, there is shown a side elevation view of another embodiment similar to the embodiment of FIG. 8S. In this embodiment, in lieu of accessory support base 64 and lower ball mount attachment platform 93 being attached to ball mount shank 15, accessory support base 64 and lower ball mount attachment platform 93 are mounted on tube 64T that serves as a collar or sleeve that slides on ball mount shank 15. For the sleeve mounted assembly to be removable from the entire assembly, steel spacer 96 may be attached only on one end to either ball mount platform 60 or lower ball mount attachment platform 93, or not attached at all and used as a separate removable spacer. Sleeve 64T is attached to the ball mount assembly by sliding the forward end of ball mount shank 15 through sleeve 64T until apertures 61 in ball mount platform 60 and 95 in lower ball mount attachment platform 93 are aligned. Tube 64T is maintained in position and lower ball mount attachment platform 93 supported in position with the installation of a tow ball. When tube 64T is properly positioned and apertures 61 and 95 aligned, steel spacer 96 is positioned between ball mount platform 60 and lower ball mount attachment platform 93 also in alignment with apertures 61 and 95. The shank of a tow ball is inserted through aperture 61 in ball mount platform 60, through steel spacer 96 and through aperture 95 in lower ball mount attachment platform 93 until the tow ball flange is seated on top of ball mount platform 60 and the tow ball shank protrudes beneath lower ball mount attachment platform 93. Tube 64T is firmly supported in position when tow ball fastener is attached to tow ball shank and tightened to the proper torque.

Figure 8V:
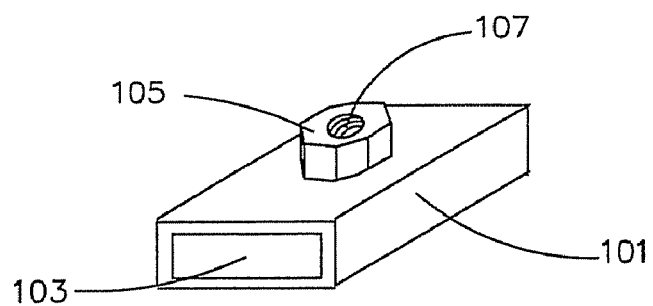
FIG. 8V is a side rear perspective view of another embodiment of the maximum security/maximum versatility ball mount assembly.
Figure 8W:
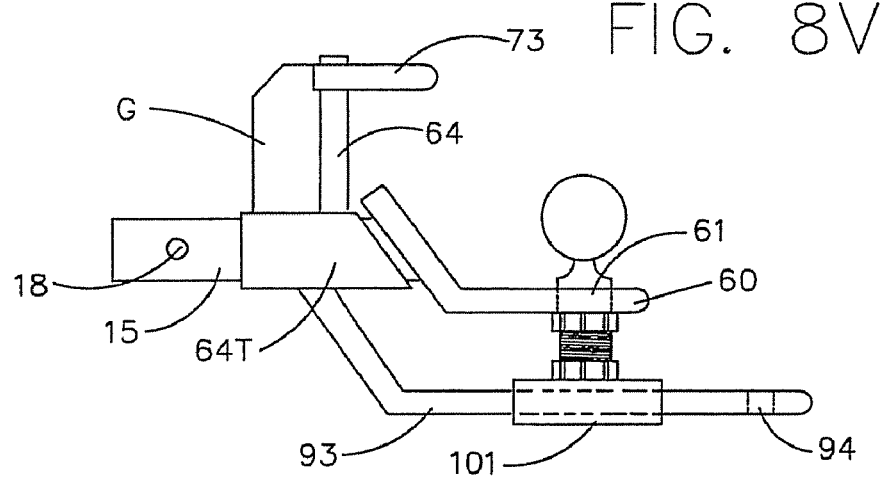
FIG. 8W is a side elevation view of the embodiment of FIG. 8U modified to include the embodiment of FIG. 8V.
Figure 8X:
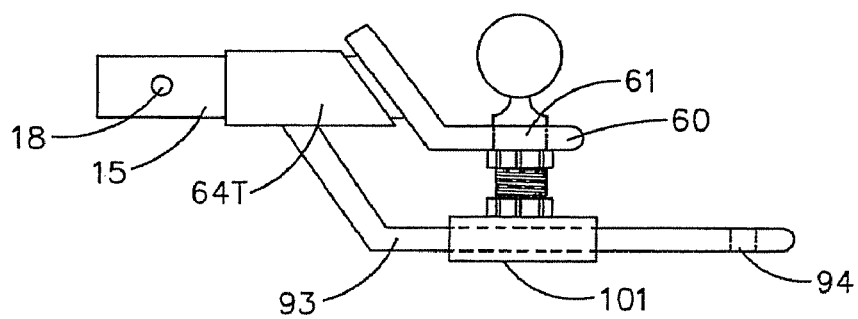
FIG. 8X is a side elevation view of a modified embodiment of FIG. 8W.

Referring to FIGS. 8V, 8W and 8X, there is shown another embodiment of the assembly. This embodiment includes lower ball mount attachment platform support sleeve 101 as shown in FIG. 8V. Lower ball mount attachment platform support sleeve 101 is a hollow, four-sided sleeve that is attached to the bottom of a hitch ball shank and used to engage and support lower ball mount attachment platform 93 as shown in FIGS. 8W and 8X. Lower ball mount attachment platform support sleeve 101 has fastener 105 attached to its upper side. Fastener 105 has internal threaded throughbore 107 to cooperate with external threads on tow ball shank for fastening lower ball mount attachment platform support sleeve 101 to trailer ball shank. Lower ball mount attachment platform support sleeve 101 is attached to trailer ball shank by turning or threading lower ball mount attachment platform support sleeve 101 onto conventional trailer ball shank. This embodiment is a sleeve-mounted assembly similar to the embodiment of FIG. 8U, but lower ball mount attachment platform 93 is supported in the installed position by lower ball mount attachment platform support sleeve 101, rather than by tow ball shank passing through aperture 95 in lower ball mount attachment platform 93. Like the embodiment of FIG. 8U, sleeve 64T is attached to the ball mount assembly by sliding the forward end of ball mount shank 15 through sleeve 64T while also sliding lower ball mount attachment platform 93 through lower ball mount attachment platform support sleeve 101. Tube 64T is secured in position on shank 15 by ball mount platform 60 and the vehicle's receiver R when the ball mount assembly is installed in and pinned to the tow vehicle's receiver R. FIG. 8X shows an alternate embodiment wherein accessory support base 64 is eliminated from the ball mount assembly.

The embodiments previously described are preferred embodiments. It should be easily recognized by one skilled in the art that utilizing the teachings of this application numerous alternate configurations can be employed to achieve the same results and benefits of the preferred embodiments without departing from the scope of this invention. FIGS. 8Y1 through 8Y6 show, as illustrative examples and not as a limiting embodiments, alternate configurations or embodiments of this maximum security/maximum versatility ball mount assembly invention.

Figure 9:
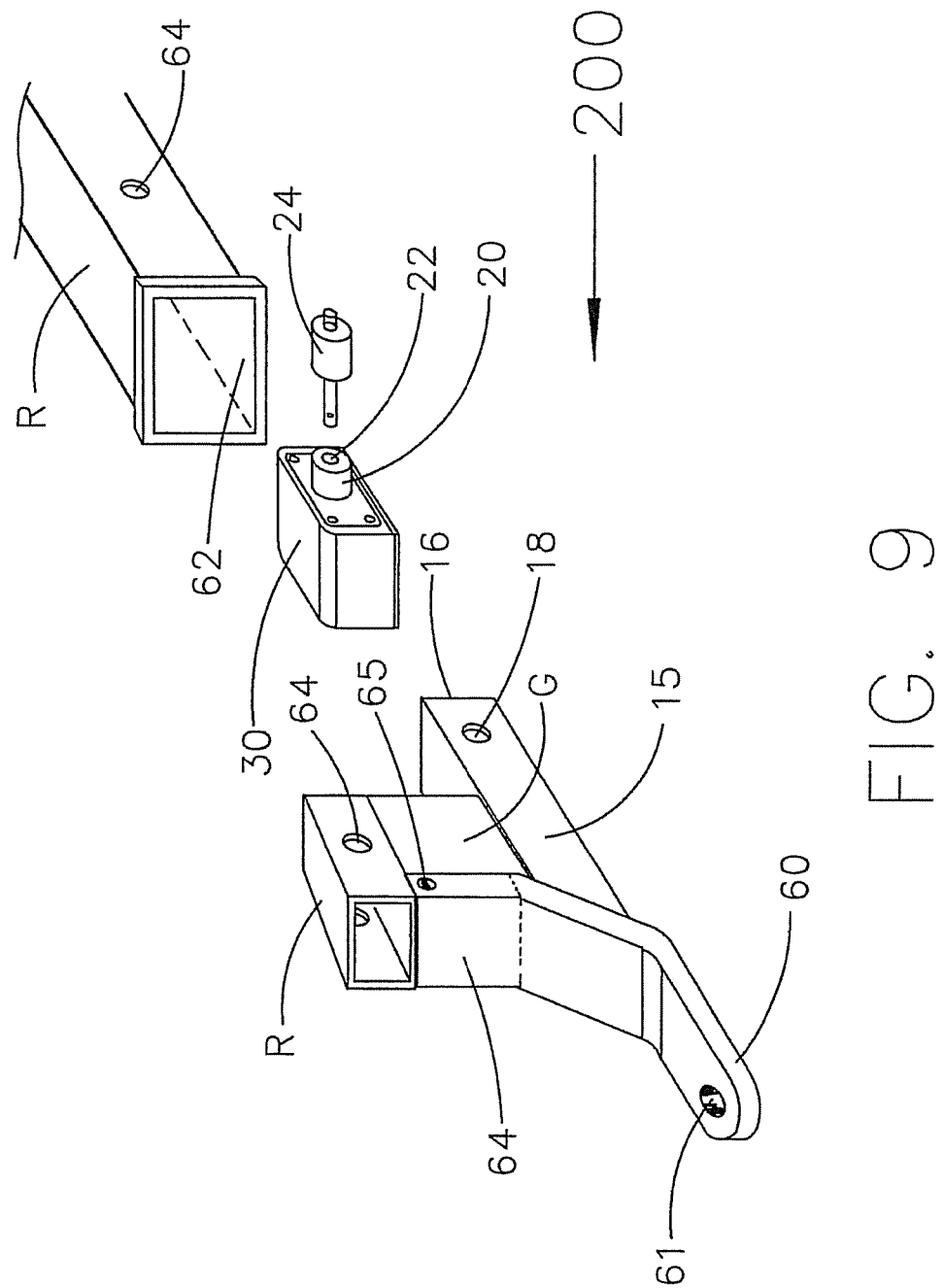
FIG. 9 is an exploded view of the maximum security/maximum versatility ball mount assembly utilizing an alternate engagement pin locking method.
Figure 10:
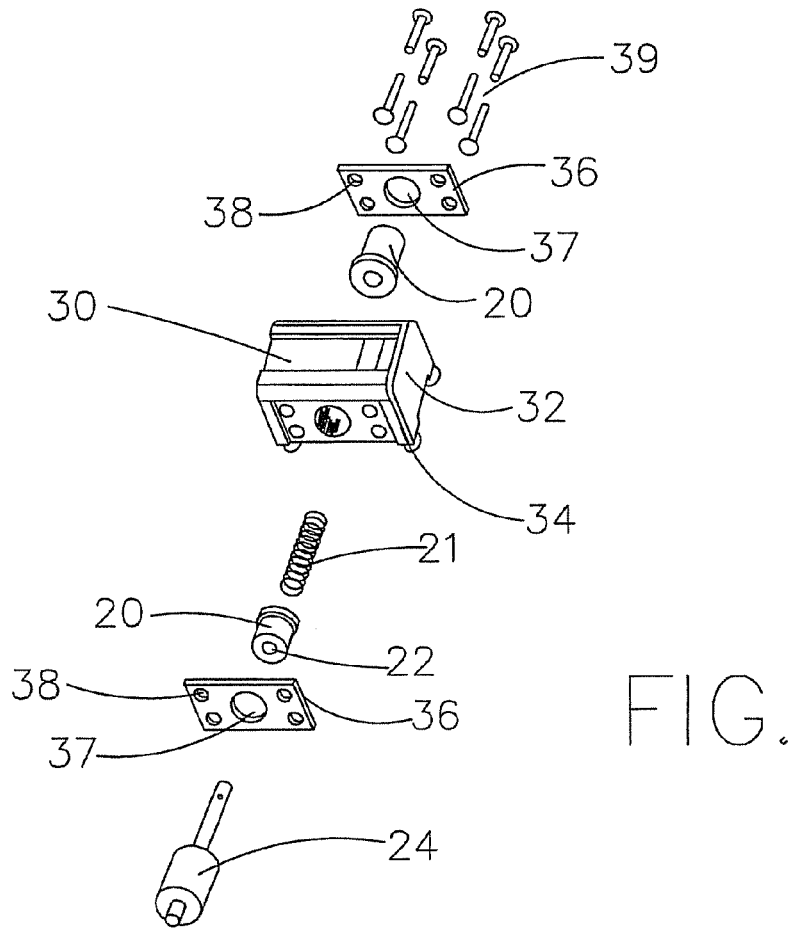
FIG. 10 is an exploded view of the components of the maximum security/maximum versatility ball mount assembly of FIG. 9.
Figure 11:
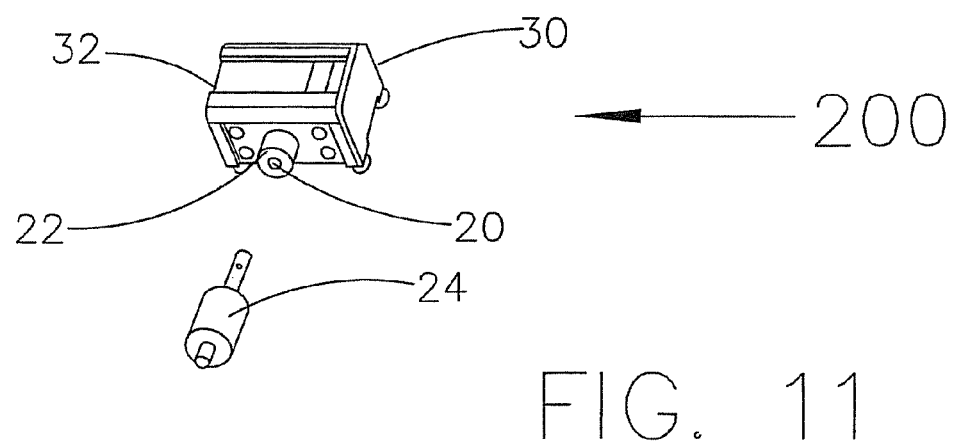
FIG. 11 is a perspective view of the components of the maximum security/maximum versatility ball mount assembly of FIG. 10.

Referring to FIGS. 9, 10 and 11 there is shown exploded views and a perspective view of another embodiment of the present invention referred to by Reference Number 200. maximum security/maximum versatility ball mount assembly 200 is comprised of the dual hitch engagement pin subassembly 30 of the embodiment of Reference Number 10 as described above with modified dual hitch engagement pins 20. Additionally FIG. 9 illustrates accessory support base 64 being utilized to support gusset G as well as supporting accessory receiver tube R.

In the illustrated embodiment, which is useful for retrofitting the shanks of existing ball mounts and other accessories, at least one of the dual hitch engagement pins 20 of subassembly 30 has a center bore 22 for attaching an engagement pin retractor inhibitor 24 to at least one of the engagement pins 20. When the maximum security/maximum versatility ball mount assembly is attached to the receiver R and the dual hitch engagement pins 20 are in the extended position, the shank 23 of engagement pin retractor inhibitor 24 is inserted into center bore 22 of engagement pin 20 and attached thereto, thus, preventing the engagement pin 20 from being retracted. Hitch engagement pin 20 is prevented from being retracted since the body of the engagement pin retractor inhibitor 24 is larger in diameter than the aperture 64 in the receiver R. Engagement pin retractor inhibitor 24 may also be a locking mechanism that is locked to engagement pin 20 preventing unintentional or unauthorized removal.

Alternatively, with center bore 22 in both hitch engagement pins 20, a locking hitch pin with a small diameter shank can be inserted through both hitch engagement pins 20 and locked into place.

Figure 12:
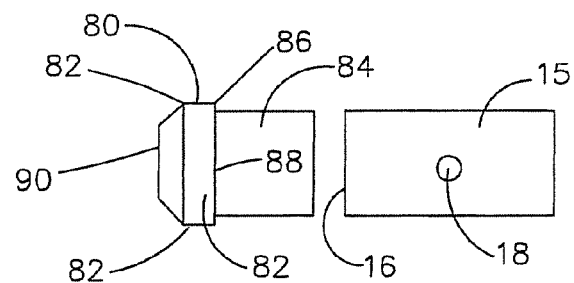
FIG. 12 is an exploded view of the ball mount shank end cap of the maximum security/maximum versatility ball mount assembly of FIG. 1.

As can easily be understood and appreciated by one skilled in the art, optimal mechanical performance of the maximum security/maximum versatility ball mount assemblies 10, 200 is achieved and maintained by shielding the assembly's integral components from dirt and/or rust particles. Thus, ball mount shank 15 may include, as shown in FIG. 12, inventive shank end cap 80. Shank end cap 80 is preferably made of plastic or any other suitable material, and, when inserted and installed in the forward end 16 of hollow ball mount shank 15, eliminates or reduces dirt and or rust particles from entering the ball mount shank cavity. As designed, with all four sides 82 of shank end cap 80 having symmetrical beveled surfaces narrowing towards the center, shank end cap 80 is also extremely useful as an alignment aid when inserting forward end 16 of ball mount shank 15 into the tow vehicle's receiver R. Shank end cap 80 has an insert shank 84 that is inserted into the hollow cavity of forward end 16 of ball mount shank 15, and a head 86. Head 86 has four sides 82, a rearward end 88 that abuts insert shank 84, and forward face 90. As shown in FIG. 12, all four sides 82 are beveled from the rearward end 88 of head 86 and narrowing at forward face 90. Head 86 may have the beveled edge on only one side and still be effective as an alignment aid when inserting ball mount shank 15 into the tow vehicle's receiver R. Thus, head 86 may have a beveled surface on one, two, three, or all four sides. Shank end cap 80 may be made from solid stock or can be a hollow end cap, and is not limited to use on a ball mount shank, but may be used on the shank of any other hitch mounted accessory as well.

Figure 13:
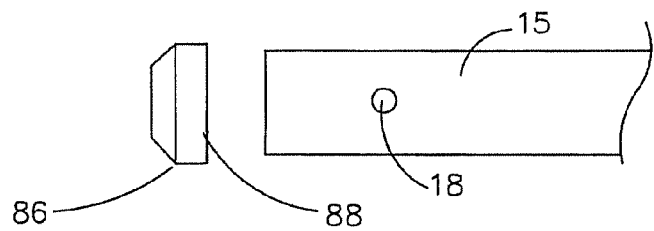
FIG. 13 is an exploded view of an alternate ball mount shank end cap of FIG. 12.
Figure 14:
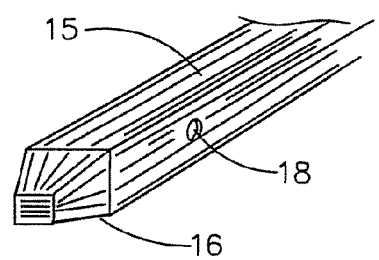
FIG. 14 is an exploded view of a hollow ball mount shank with a modified end of the maximum security/maximum versatility ball mount assembly of FIG. 1.
Figure 15:
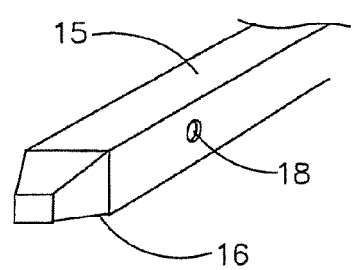
FIG. 15 is an exploded view of a solid ball mount shank with a modified end of the maximum security/maximum versatility ball mount assembly of FIG. 1.

Alternatively, in lieu of shank end cap 80 having insert shank 84, shank end cap 80 may consist of just head 86 for use on a solid ball mount shank. As shown in FIG. 13, in this embodiment, double-sided tape, a magnetic surface or the like can be applied to rearward end 88 of head 86 and shank end cap 80 affixed to solid ball mount shank 15. As shown in FIG. 14, as another alternative of this embodiment, beveled ends may be forged or machined directly on forward end 16 of ball mount shank 15 that is inserted into the receiver R. Additionally, in another embodiment as shown in FIG. 15, the sides of the forward end 16 of hollow ball mount shank 15 may be bent inward resulting in a beveled like surface on the forward end 16 of ball mount shank 15.

Figure 16:
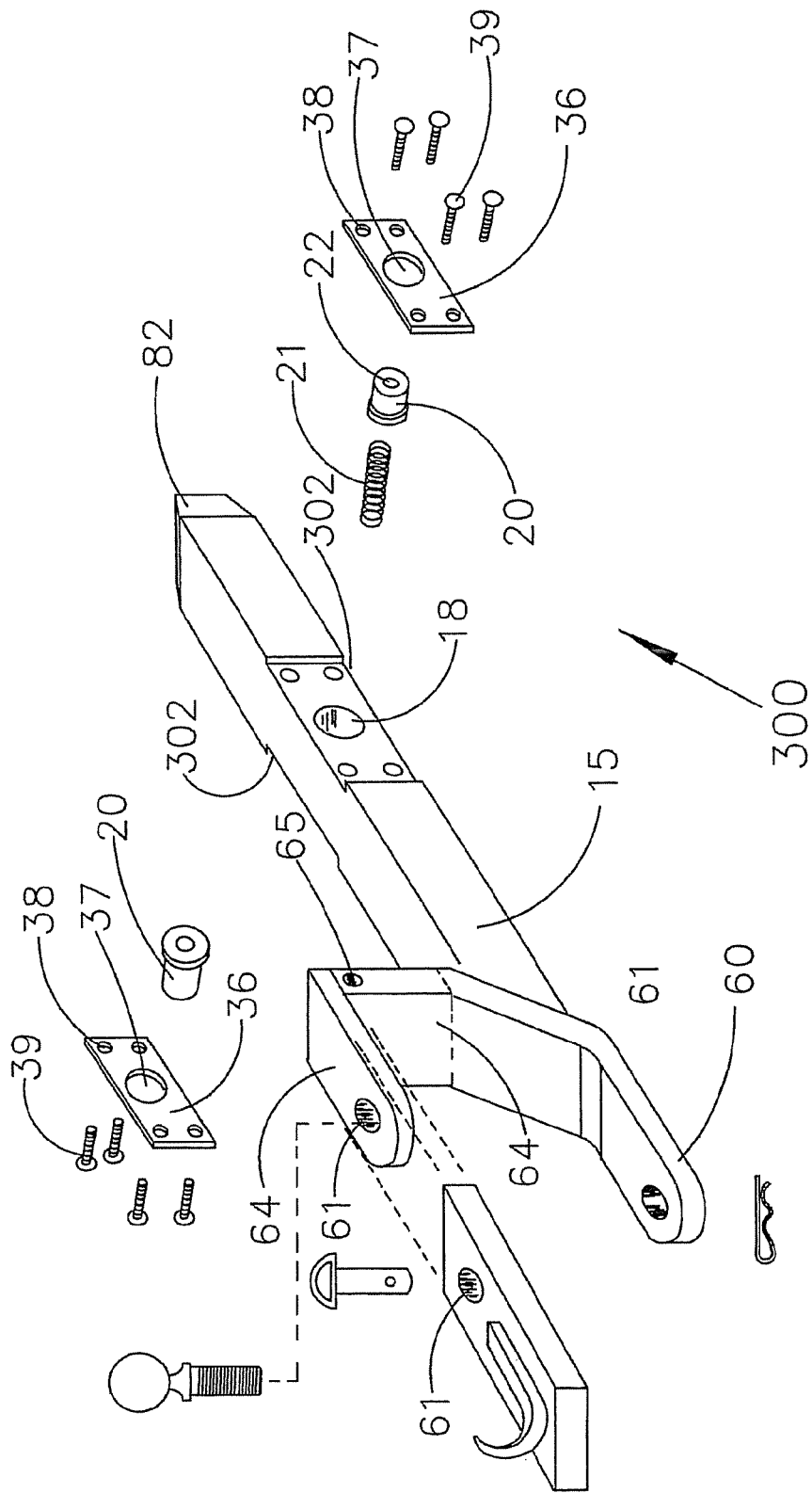
FIG. 16 is an exploded view of the maximum security/maximum versatility ball mount assembly of FIG. 9 mounted on a solid shank.

Referring to FIG. 16, there is shown an exploded view of another embodiment of FIG. 1. In this embodiment referred to as Reference Number 300, the self-engaging receiver/hitch pin assembly is mounted on a solid shank 15. Hitch pin bore 18 serves as the housing or cavity for dual hitch engagement pins 20 and biasing means, such as spring 21. Dual side plates 36 are attached to corresponding recessed areas 302 of shank 15 with screws 39 or other method such as welded. Dual hitch engagement pins 20 may contain center bore 22 and employ the engagement pin retractor inhibitor 24 or locking hitch pin with a small diameter shank as described in the previous embodiment. Additionally FIG. 16 illustrates accessory support base 64 being utilized to accommodate the attachment of a tow ball or alternatively the attachment of other hitch accessories such as a tow hook. As shown, other hitch accessories may be mounted on a hollow sleeve that engages accessory support base 64 and secured to accessory support base 64 with a pin and clip as shown or any other desirable method such as nut and bolt.

Figure 17:
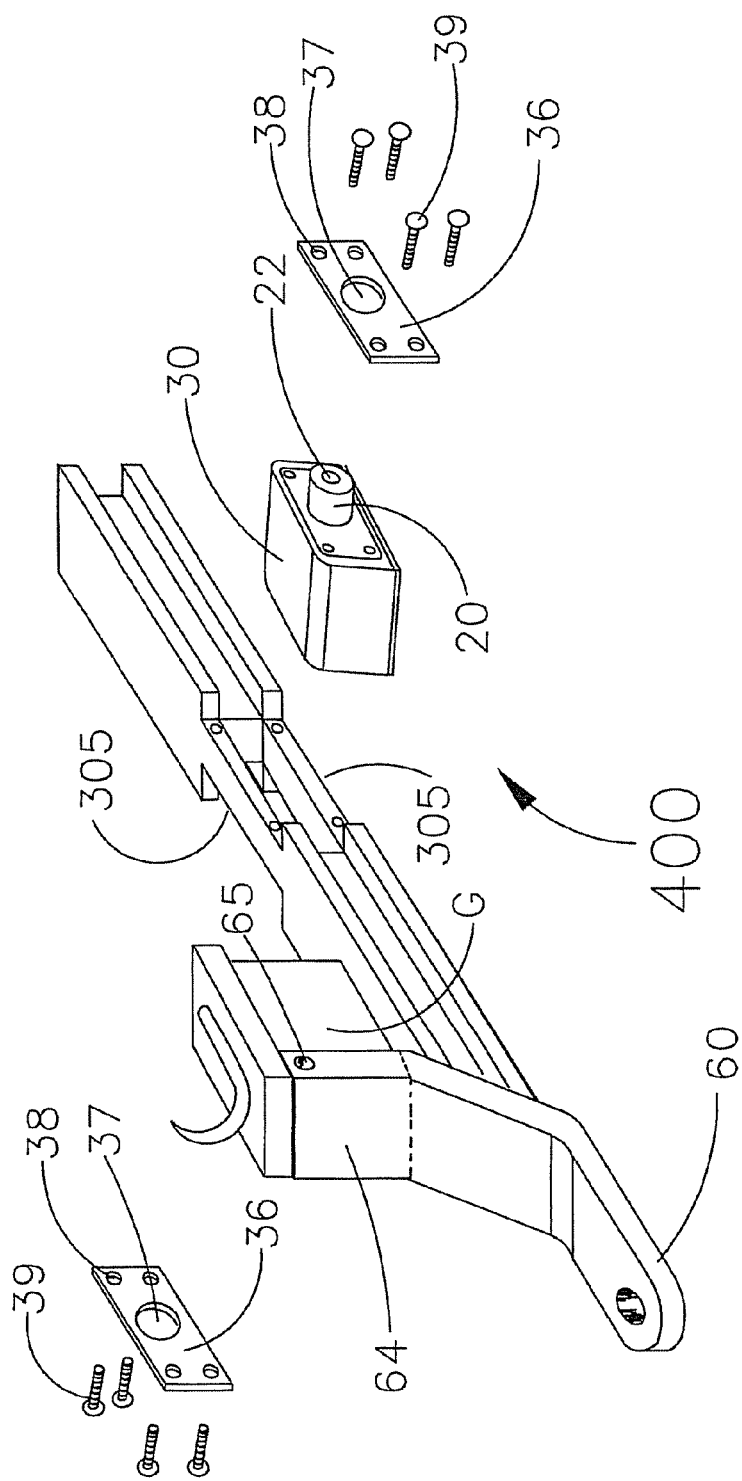
FIG. 17 is an exploded view of the maximum security/maximum versatility ball mount assembly of FIG. 9 mounted on an I-beam shank.

Referring to FIG. 17, there is shown an exploded view of another embodiment of FIG. 1 referred to as Reference Number 400. In this embodiment, dual hitch engagement pin subassembly 30 is placed within shank 15 through a cut-out in the web of the I-beam shank corresponding to the dimensions of subassembly 30. Dual side plates 36 are attached to corresponding recessed areas 305 of shank upper and lower flanges with screws 39 or other means such as by welding. Dual hitch engagement pins 20 may contain center bore 22 and employ the engagement pin retractor inhibitor 24 or locking hitch pin with a small diameter shank as described in the previous embodiment. Additionally FIG. 17 illustrates accessory support base 64 being utilized to support gusset G as well as supporting accessory tow hook.

Figure 18:
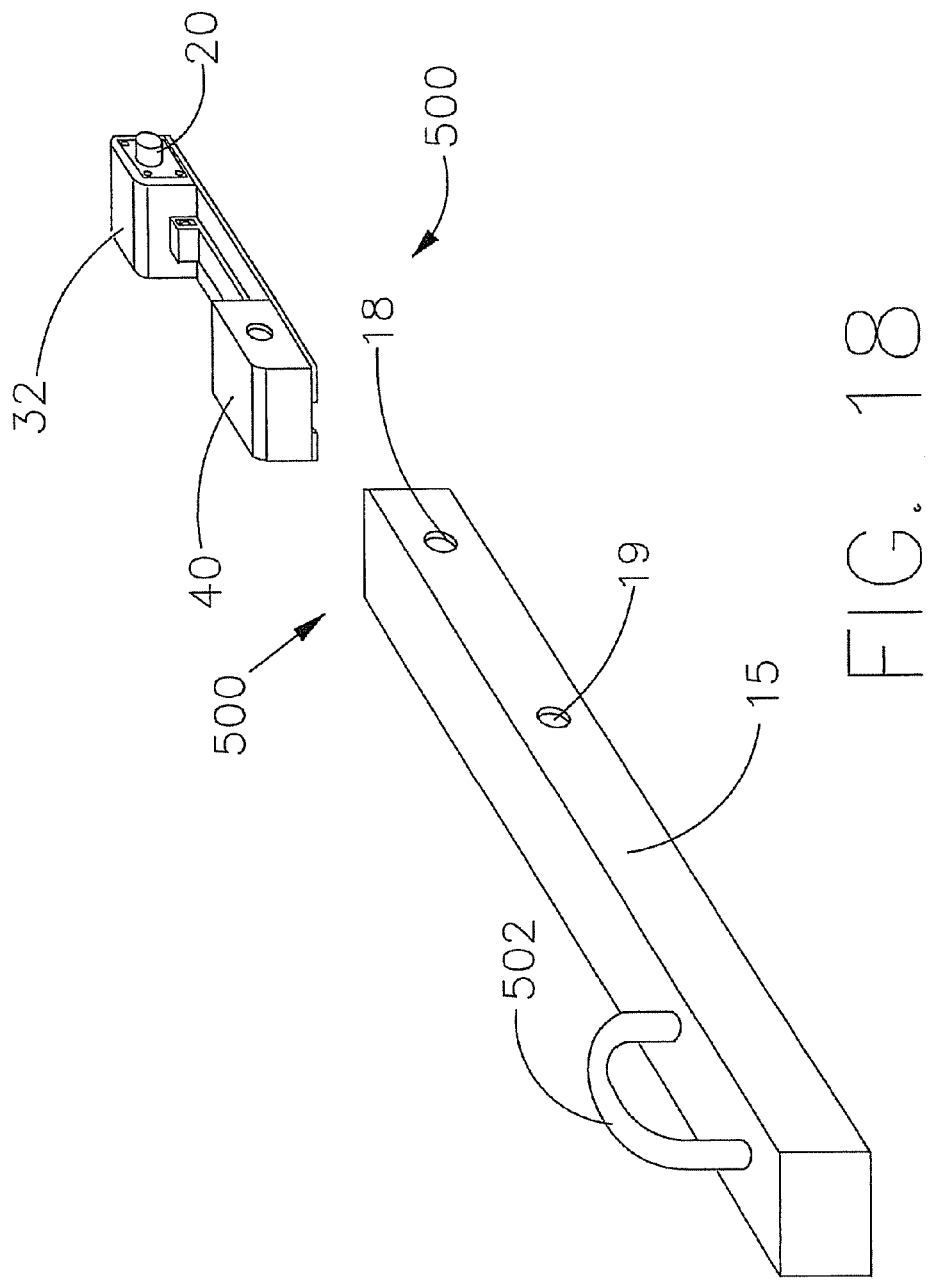
FIG. 18 is an exploded view of the maximum security/maximum versatility ball mount assembly mounted in the shank of a tow hook.

Referring to FIG. 18, there is shown an exploded view of another embodiment of FIG. 1. In this embodiment referred to as Reference Number 500, for illustrative purposes, the self-engaging receiver/hitch pin subassembly 50 is mounted in the shank of tow ring 502. As can be appreciated by one skilled in the art, the self-engaging receiver/hitch pin assembly of the present invention can be applied to the shank of numerous hitch mounted products. Such embodiments are meant to be included within the scope of this application.

Figure 19:
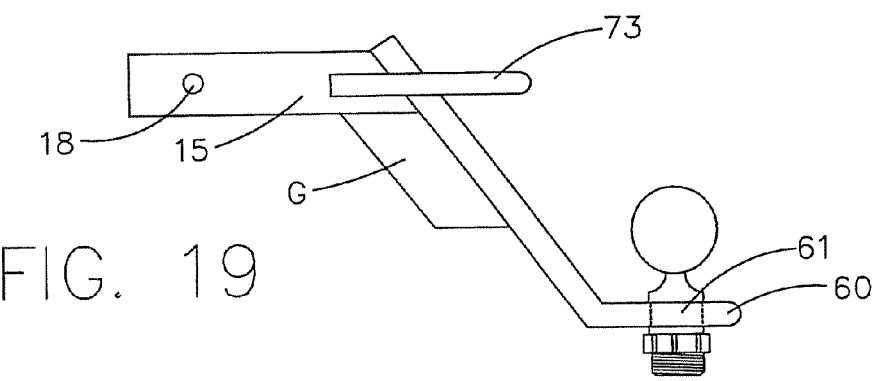
FIG. 19 is a side elevation view of an alternate embodiment of the embodiment of FIG. 8N.

Referring to FIG. 19, there is shown a side elevation view of an alternate embodiment of the embodiments of FIGS. 8E, 8F, 8G and 8N. In this embodiment, in lieu of tow ring legs 77 being mounted on shank 15 parallel with shank 15 as shown in FIG. 8N, tow ring legs 77 are mounted to sides of shank 15 as shown. This embodiment is particularly useful for ball mounts with a drop ball mount platform 60.

Figure 20:
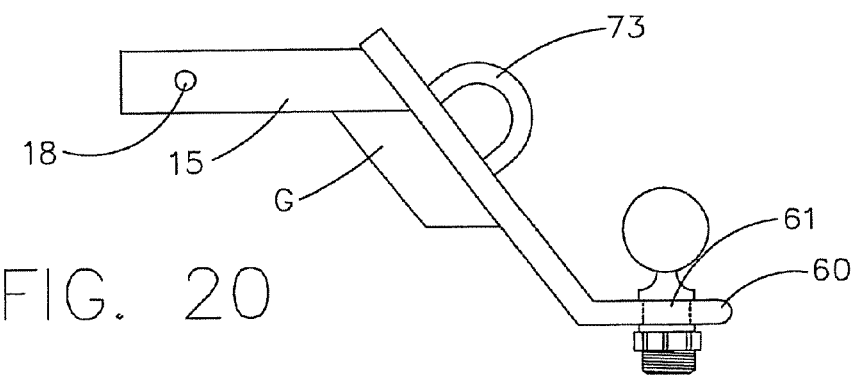
FIG. 20 is a side elevation view of yet another alternate embodiment of the embodiment of FIG. 8N.

Referring to FIG. 20, there is shown a side elevation view of an alternate embodiment of the embodiment of FIG. 8N. In this embodiment, in lieu of tow ring 73 being mounted to shank 15, tow ring 73 is mounted to rearward face of ball mount platform 60 as shown. This embodiment is also particularly useful for ball mounts with a drop ball mount platform 60.

Figure 21:
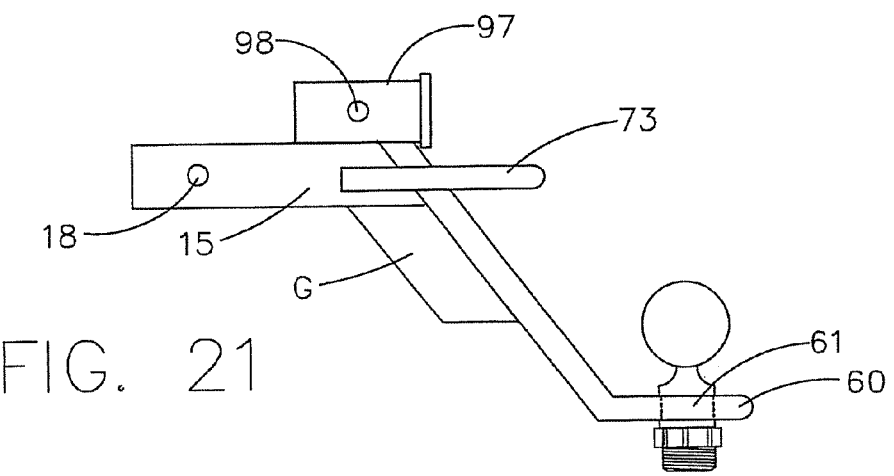
FIG. 21 is a side elevation view of an alternate embodiment of the embodiment of FIG. 19.

Referring to FIG. 21, there is shown a side elevation view of an alternate embodiment of the embodiment of FIG. 19. This embodiment incorporates receiver tube 97 mounted to ball mount platform 60 and the topside of shank 15. This embodiment is particularly useful for ball mounts with a drop ball mount platform 60.

Figure 22:
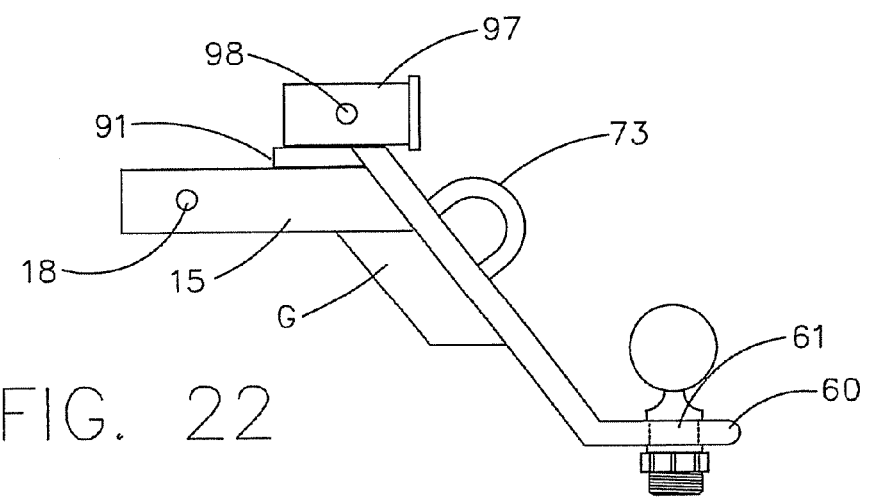
FIG. 22 is a side elevation view of an alternate embodiment of the embodiment of FIG. 20.

Referring to FIG. 22, there is shown a side elevation view of an alternate embodiment of the embodiment of FIG. 20. In this embodiment, in lieu of receiver tube 97 being mounted to shank 15, receiver tube 97 is mounted to ball mount platform 60 and spacer bar 91, which is mounted to ball mount shank 15. This embodiment is also particularly useful for ball mounts with a drop ball mount platform 60.

Figure 23:
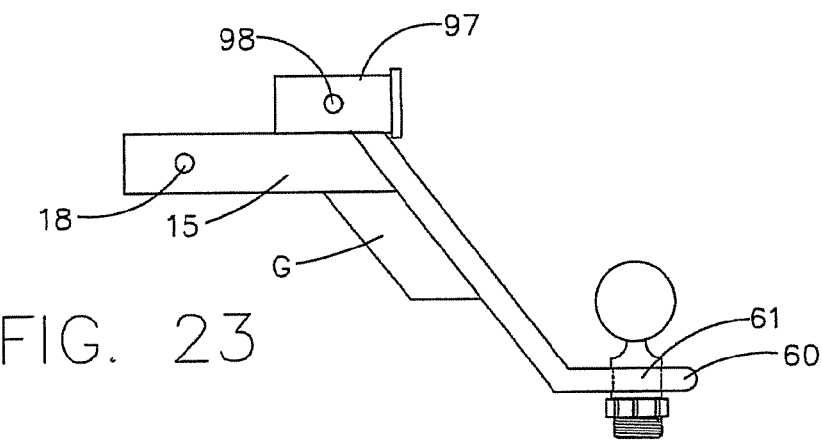
FIG. 23 is a side elevation view of an alternate embodiment of the embodiment of FIG. 21.

Referring to FIG. 23, there is shown a side elevation view of an alternate embodiment of the embodiment of FIG. 21. In this embodiment, tow ring 73 is eliminated from the assembly.

Figure 24:
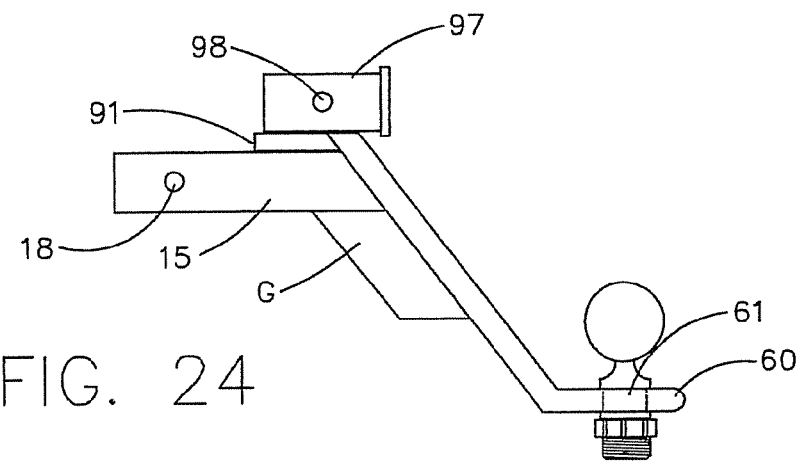
FIG. 24 is a side elevation view of an alternate embodiment of the embodiment of FIG. 22.

Referring to FIG. 24, there is shown a side elevation view of an alternate embodiment of the embodiment of FIG. 22. In this embodiment, tow ring 73 is eliminated from the assembly.

Figure 25:
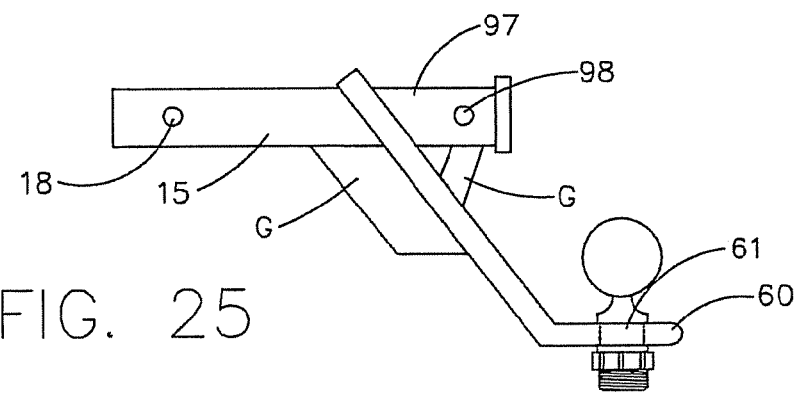
FIG. 25 is a side elevation view of an alternate embodiment of the embodiment of FIG. 23.

Referring to FIG. 25, there is shown a side elevation view of an alternate embodiment of the embodiment of FIG. 23. In this embodiment, in lieu of receiver tube 97 being mounted to the topside of shank 15, receiver tube 97 is mounted to the rearward face of ball mount platform 60 as shown, and may include gusset G as desirable. This embodiment is useful for ball mounts with a drop ball mount platform 60.

Figure 26:
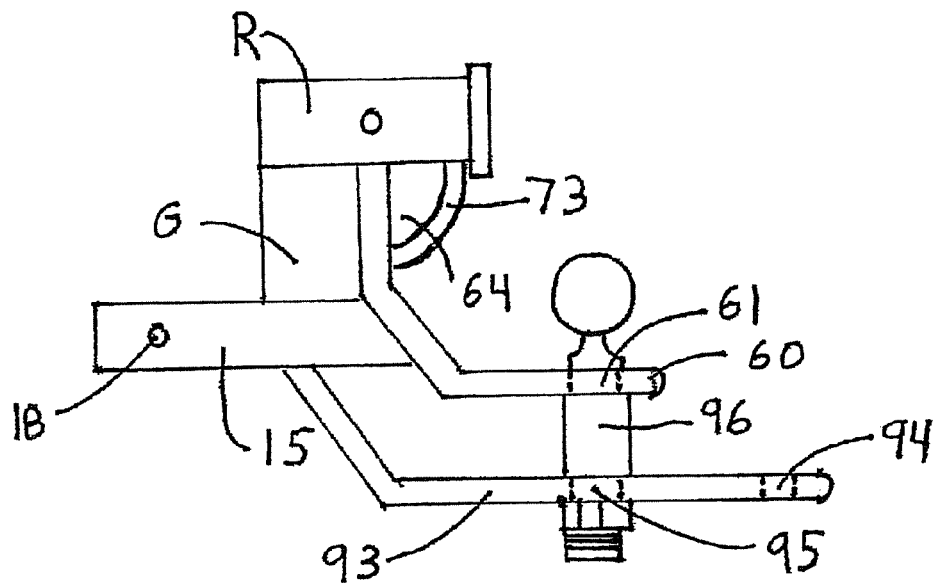
FIG. 26 is a side elevation view of an alternate embodiment of the embodiment of FIG. 8S.

Referring to FIG. 26, there is shown a side elevation view of an alternate embodiment of the embodiment of FIG. 8S. In this embodiment, in lieu of tow ring 73 being mounted to the top of accessory support base 64, receiver tube R is mounted to the top of accessory support base 64 and tow ring 73 mounted between the bottom side of receiver tube R and rearward face of accessory support base 64 as shown.

Figure 27:
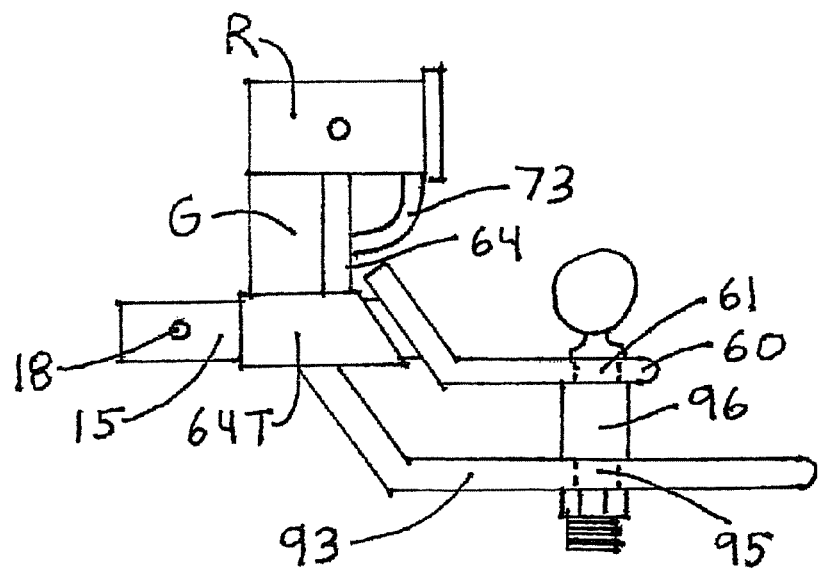
FIG. 27 is a side elevation view of an alternate embodiment of the embodiment of FIG. 8U.

Referring to FIG. 27, there is shown a side elevation view of an alternate embodiment of the embodiment of FIG. 8U. In this embodiment, in lieu of tow ring 73 being mounted to the top of accessory support base 64, receiver tube R is mounted to the top of accessory support base 64 and tow ring 73 mounted between the bottom side of receiver tube R and rearward face of accessory support base 64 as shown.

Any or all of the embodiments of this application may incorporate vertical hitch pin throughbore described, illustrated in U.S. application Ser. No. 11/732,117, filed on Apr. 2, 2007 (herein incorporated by reference).

It is to be understood that the present invention is not limited to the embodiments described above but encompasses any and all embodiments within the scope of the following claims.

What is claimed is:

1. A vehicle ball mount assembly, comprising:
a shank having a top surface;
a ball mount platform attached to the shank; and
an accessory support base, wherein the ball mount platform and the accessory support base are fabricated as a single piece of metal with the accessory support base formed by an extended section of the ball mount platform projecting above the top surface of the shank and configured to extend into a hollow recess of an accessory attachment.

2. The vehicle ball mount assembly of claim 1, wherein the accessory support base includes a throughbore extending through the accessory support base.

3. The vehicle ball mount assembly of claim 2, further including an accessory attachment, wherein the accessory attachment includes an accessory attachment base having a throughbore and a hollow recess configured to engage the accessory support base, with the throughbore of the accessory support base configured to align with the throughbore of the accessory attachment base.

4. The vehicle ball mount assembly of claim 1, wherein the accessory support base is angled with respect to an upper portion of the ball mount platform.

5. The vehicle ball mount assembly of claim 1, wherein the accessory attachment is a tow ring connected to the accessory support base.

6. The vehicle ball mount assembly of claim 1, wherein a lower portion of the ball mount platform extends rearward of and parallel to the shank.

7. The vehicle ball mount assembly of claim 6, wherein the lower portion of the ball mount platform further includes a throughbore.

8. The vehicle ball mount assembly of claim 6, wherein one or more tow balls are attached to the lower portion of the ball mount platform.

9. The vehicle ball mount assembly of claim 1, further including a hitch accessory having an accessory attachment base having a cavity configured to slip onto the accessory support base such that the accessory support base extends into the accessory attachment base.

10. A vehicle ball mount assembly, comprising:
a shank having a top surface;
a ball mount platform attached to the shank; and
an accessory support base extending above the top surface of the shank and the ball mount platform,
wherein the accessory support base is attached to the ball mount platform, wherein a tow ring is connected to the accessory support base, wherein a lower ball mount platform is attached to the shank and extends below and beyond the ball mount platform, wherein a spacer is positioned between the ball mount platform and the lower ball mount platform, and wherein the lower ball mount platform includes a mounting bore.

11. A vehicle ball mount assembly, comprising:
a shank having an outer end, an inner end, and a top side;
a ball mount platform attached to the outer end of the shank and configured to receive a hitch ball;
an accessory support base, with the ball mount platform and the accessory support base fabricated as a single piece of metal with the accessory support base formed by an extended section of the ball mount platform extending above the top side of the shank; and
a tow ring permanently attached to the accessory support base and extending above the ball mount platform, wherein an outer end of the ball mount platform extends beyond an outer end of the tow ring.

12. The vehicle ball mount assembly of claim 11, including a gusset extending between and connected to the top surface of the shank and the accessory support base.

13. The ball mount assembly of claim 11, wherein the tow ring is attached to a forward face of the accessory support base.

* * * * *